(12) United States Patent
Rhia

(10) Patent No.: US 7,896,577 B2
(45) Date of Patent: Mar. 1, 2011

(54) THIXOTROPIC GEL FOR VADOSE ZONE REMEDIATION

(75) Inventor: Brian D. Rhia, Augusta, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 327 days.

(21) Appl. No.: 12/074,735

(22) Filed: Mar. 6, 2008

(65) Prior Publication Data

US 2008/0219773 A1    Sep. 11, 2008

Related U.S. Application Data

(60) Provisional application No. 60/905,158, filed on Mar. 6, 2007.

(51) Int. Cl.
*B09B 1/00* (2006.01)

(52) U.S. Cl. .................................. 405/128.75

(58) Field of Classification Search .............. 405/128.1, 405/128.15, 128.45, 128.5, 128.7, 128.75
See application file for complete search history.

(56) References Cited

U.S. PATENT DOCUMENTS

| | | | | |
|---|---|---|---|---|
| 5,265,674 A | * | 11/1993 | Fredrickson et al. | 166/246 |
| 5,370,478 A | * | 12/1994 | Bartlett et al. | 405/129.6 |
| 5,545,803 A | * | 8/1996 | Heath et al. | 588/253 |
| 6,059,973 A | * | 5/2000 | Hudson et al. | 210/610 |

\* cited by examiner

*Primary Examiner*—John Kreck
(74) *Attorney, Agent, or Firm*—J. Bennett Mullinax, LLC

(57) ABSTRACT

A thixotropic gel suitable for use in subsurface bioremediation is provided along with a process of using the gel. The thixotropic gel provides a non-migrating injectable substrate that can provide below ground barrier properties. In addition, the gel components provide for a favorable environment in which certain contaminants are preferentially sequestered in the gel and subsequently remediated by either indigenous or introduced microorganisms.

9 Claims, 20 Drawing Sheets

Figure 8 Diagram showing method used to assign spatial viscosity values for non-Newtonian simulations.

Figure 9 Diagram showing method used to estimate total gradient for Non-Newtonian simulations.

THIXOTROPIC GEL FOR VADOSE ZONE REMEDIATION

RELATED APPLICATION

This application claims the benefit of U.S. Application Ser. No. 60/905,158, filed on Mar. 6, 2007, and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed towards materials which may be introduced in or near a vadose zone to improve remediation efforts and efficiency with respect to vadose zone contamination.

BACKGROUND OF THE INVENTION

The use of silica solutions and silica gels to solidify soil and render soil impermeable are well known in the art. U.S. Pat. No. 3,552,130 entitled, "Method of Forming a Substantially Liquid Impervious Wall in an Earth Formation", and which is incorporated herein by reference, discloses introducing materials into a soil in which a filler material is mixed with a silica gel to form a material which will render certain soil types impermeable.

U.S. Pat. No. 3,375,872, entitled "Method of Plugging or Sealing Formations With Acidic Silicic Acid Solutions", and which is incorporated herein by reference, discloses a method of sealing earth formations using a low pH silicic acid solution.

It is also known in the art to introduce oils such as a vegetable or mineral oil into a below ground contaminated area. The oil serves to concentrate and remove organic contaminants from the soil so that the contaminants may be removed by recovery of the oil or may be metabolized by microorganisms which may be introduced into the oil fraction. One such use of this technology is seen in U.S. Pat. No. 5,265,674 entitled "Enhancement of in Situ Microbial Remediation of Aquifers", and which is incorporated herein by reference.

One difficulty of contamination remediation in the vadose zone is the tendency for treatment materials to flow straight down with little lateral spreading. In addition, low viscosity materials leave low concentrations of the treatment materials in the soil pore spaces. Higher viscosity materials increase the saturation of the materials within the soil pore spaces but are difficult to emplace within a significant sized volume needed for typical remediation environments.

Other difficulties of contamination remediation in the vadose zone is that the vadose zone tends to be highly gas permeable, has a moisture content that is less than saturation, and a pressure that varies due to atmospheric pressure variations which create significant gas fluxes. The vadose zone can be highly permeable to the influx of rain and surface water which can leach contaminants into the groundwater. Oxygen and other gases enter the vadose zone through the percolation of rain and surface water and through gas exchange by diffusion and from barometric pressure differentials with the surface. As a result of these properties, it is difficult to perform certain bioremediation and physical techniques within the vadose zone given the permeability, and the open, porous nature of the vadose region.

Accordingly, there remains room for improvement and variation within the art.

SUMMARY OF THE INVENTION

It is one aspect of at least one of the present embodiments to provide a thixotropic mixture of water and oil which will form a gel within an otherwise permeable vadose zone. The non-toxic gel of water and oil may be created having a wide range of viscosities tailored to the specific permeability of the vadose zone so as to provide a specific gel saturation value within the soil and a barrier within the vadose zone. The permanence of the barrier may be controlled by application of surfactants.

It is another aspect of at least one of the embodiments of the present invention to apply within a vadose zone a non-migrating stable gel of a thixotropic mixture of water and oil. The resulting gel, having a non-polar oil constituent, will preferentially attract and sequester a number of non-polar contaminants within the vadose zone. Once the contaminants are within the thixotropic gel, the contaminants are less likely to migrate and contaminate groundwater.

It is another aspect of at least one of the embodiments of the present invention to introduce within a vadose zone a non-migrating stable gel of a thixotropic mixture of water and oil. Once the contaminants are within the thixotropic gel, the contaminants are more amenable to bioremediation by native in situ microorganisms or through the application of other microorganisms by providing a carbon source (oil) for the microbes to grow and water for the microbes to live in.

It is another aspect of at least one of the present embodiments of the invention to provide a thixotropic, non-toxic gel of water and oil that may be introduced into a vadose zone. The resulting gel creates an anaerobic environment within the vadose zone, the anaerobic environment being beneficial for supporting desirable microorganisms that can bioremediate contaminants present within the vadose zone.

It is another aspect of at least one of the present embodiments of the invention to provide a thixotropic, non-toxic gel of water and oil that may be introduced into a vadose zone. The resulting gel creates a persistent and durable barrier to trap downward migrating contaminants and decrease water infiltration.

It is yet another aspect of at least one embodiment of the present invention to provide for a process of using a fumed silica in combination with an oil/water mixture to create a thixotropic material that may be injected as a liquid into a vadose zone and thereafter forms a substantially more viscous gel. The resulting gel has a long term residence time within the vadose zone allowing migration of certain contaminants such as chlorinated solvents into the gel. Once present within the gel, indigenous or supplemental microorganisms can more effectively degrade the contaminants. The size, density, and physical properties of the resulting gel may be adjusted to bring about anaerobic conditions in the vadose zone where such conditions are useful for the growth and maintenance of microorganisms useful for bioremediation efforts.

It is yet another aspect of at least one of the present embodiments of the invention to provide a thixotropic, non-toxic gel of water and oil containing certain amendments and which may be introduced into a vadose zone. The resulting gel and the amendments therein may be used to control the geo chemistry of the vadose zone. For instance, microbial activity and the resulting changes of pH and redox potential can facilitate the remediation and/or sequestering of certain metals.

It is yet another aspect of at least one of the present embodiments of the invention to provide a thixotropic, non-toxic gel of water and oil having amendments therein can be introduced into a vadose zone. The resulting gel contains macro and micro nutrients to increase the microbiological activity in the vadose zone. Macronutrients such as nitrogen and phosphorus may be incorporated into the gel in specific ratios to control the amount of biomass formed.

It is yet another aspect of at least one of the present embodiments of the invention to provide a thixotropic gel for injecting into a subsurface soil comprising: about 40 percent to about 60 percent by volume of a biodegradable vegetable oil such as soybean oil or mineral oil and combinations thereof; about 40 percent to about 60 percent by volume of water which may be comprised of additional water soluble carbon sources such as sugars, lactate, etc.; and, fumed silica in an amount of between about 0.75 percent to about 2.0 percent by weight. The thixotropic gel may further comprise nutritional organic supplements to supply nitrogen, phosphorus, and other nutrients for supporting microbial growth such as yeast extracts, vitamins, corn steep liquor, seaweed extracts, and organic and inorganic fertilizer species and combinations thereof.

It is yet another aspect of at least one of the present embodiments of the invention to provide a process of bioremediation within a vadose zone comprising: identifying a vadose zone contaminant area; creating a thixotropic injectable solution comprising a mixture of an oil, water, and fumed silica; agitating the thixotropic injectable solution, thereby enabling the thixotropic injectable solution to be injected under pressure to a subsurface vadose zone; injecting the thixotropic solution into the vadose zone, said injectable solution thereby forming a non-migrating gel within the vadose zone; wherein the non-migrating gel establishes an in situ anaerobic environment in response to biological colonization within the non-migrating gel. The process of creating a thixotropic injectable solution may include sparging the solution with nitrogen gas to remove free oxygen.

It is yet another aspect of at least one of the present embodiments of the invention to provide a process of remediating volatile organic compounds within a vadose zone comprising: injecting a thixotropic material into a vadose zone contaminated with volatile organic compounds, the thixotropic material comprising a vegetable oil such as soybean oil or mineral or animal oil and combinations thereof; sequestering within the oil the non-polar volatile organic compounds present within the vadose zone; establishing anaerobic conditions within the thixotropic material; and, degrading said volatile organic compounds by the metabolic activity of bacteria present within the thixotropic material.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1:
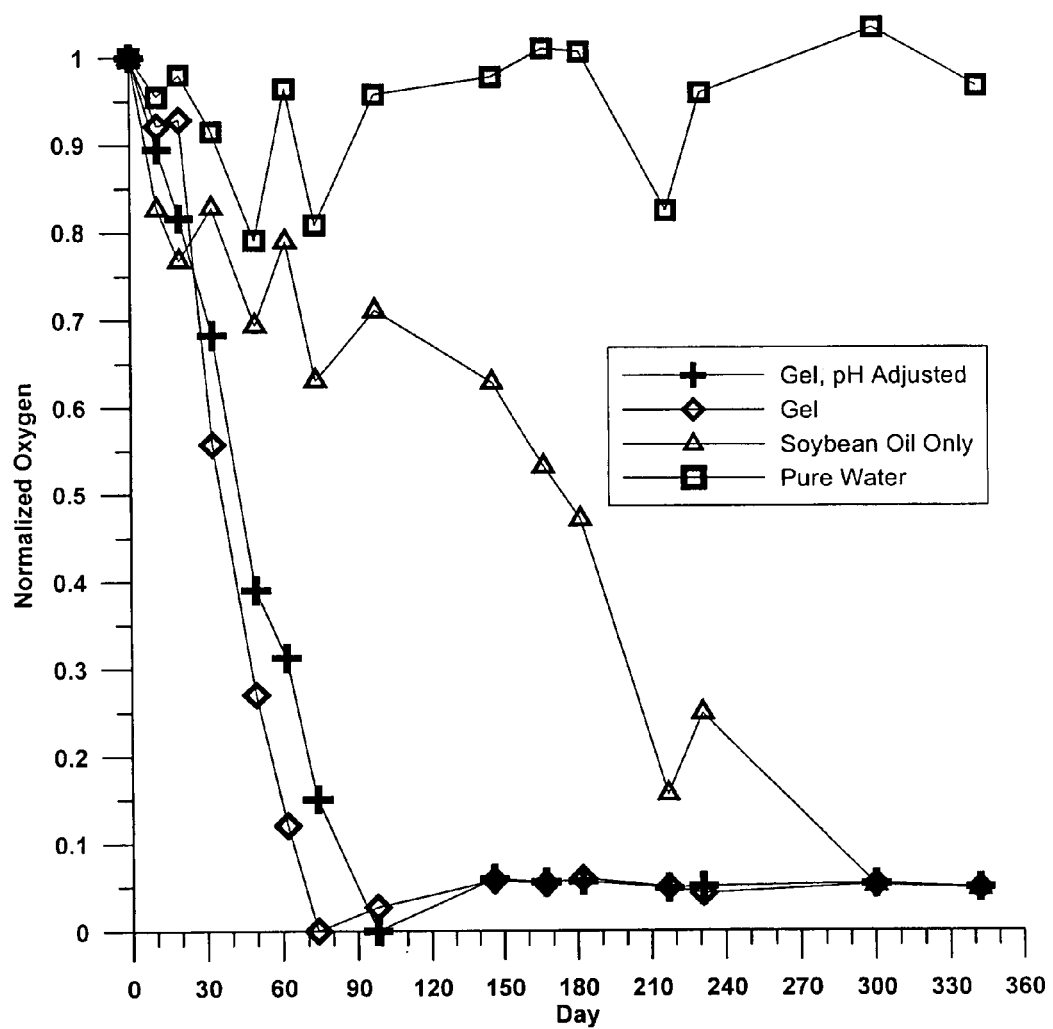
FIGS. 1 through 4 are graphs depicting characteristics of thixotropic gels when combined with native soil microorganisms.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Vadose zone contamination is a wide spread problem, the contamination resulting from numerous industrial practices. While a vadose zone contamination source is typically small in area compared to a corresponding ground water contamination plume, the vadose zone contamination is at a higher concentration. Further, without remediation, the vadose zone contamination provides a contamination source for surrounding ground water which creates a long-term ground water contamination problem. The vadose zone is also characterized by reduced microbial activity since moisture content and nutrient availability is substantially less in the vadose zone.

Application of a gel within the vadose zone provides an improved environment for microbial colonization since there is a higher water content. If desired, various nutritional supplements may be added to a gel mix and will support a higher microbial population in the vadose zone than would otherwise occur. Heretofore, microbial bioremediation has been mainly directed to ground water contamination or used in above ground reactors in a pump-and-treat type system. The highly permeable nature of the vadose zone along with the low water content and aerobic conditions have limited the use of bioremediation as a primary technique for vadose zone treatment strategies for certain contaminants.

In accordance with this invention, it has been found that an oil/water mixture may be formed into a thixotropic injectable solution using fumed silica (silicon dioxide, pyrogenic silica) as an amendment. Under agitation, the resulting suspension has very fluid and liquid properties which lend to conventional below ground injection techniques for placement within the vadose zone. Once injected in the vadose zone, the oil/water combination will form a thick gel which thereafter is resistant to downward migration through the permeable vadose zone.

By controlling the relative amounts of oil to water, the relative amount of fumed silica, and the pH of the mixture, keeping into account potential pH changes associated with materials (minerals) present within the vadose zone, one having ordinary skill in the art may provide for a range of thixotropic oil/water materials which will form gels of varying viscosities and geochemical properties. Useful oils include soy bean oil, safflower oil, flaxseed oil, sunflower oil, corn oil, olive oil, peanut oil, cottonseed oil, mineral oil, animal oils, and combinations thereof.

As set forth in FIG. 1, data from a sample gel formulation of 50 percent water, 50 percent soy bean oil, and 1.4 percent by weight fumed silica (Cab-O-Sil™) is used to construct gel containing soil samples including native microorganisms using soil samples collected from a depth of between about 18 to about 21 feet from a non-contaminated location on the property under jurisdiction of the Savannah River National Laboratory. Each sample microcosm consisted of 2 cm$^3$ soil and 1 mil of the appropriate liquid (gel, water, soybean oil). The microcosms were provided with a 20 mil head space in a vial having septum seals to aid in gas chromatography analysis.

As seen in reference to FIG. 1, the gel formulations help establish anaerobic conditions within a vadose zone in comparison to samples using only pure water or neat soy bean oil with natural soil water content.

Figure 2:
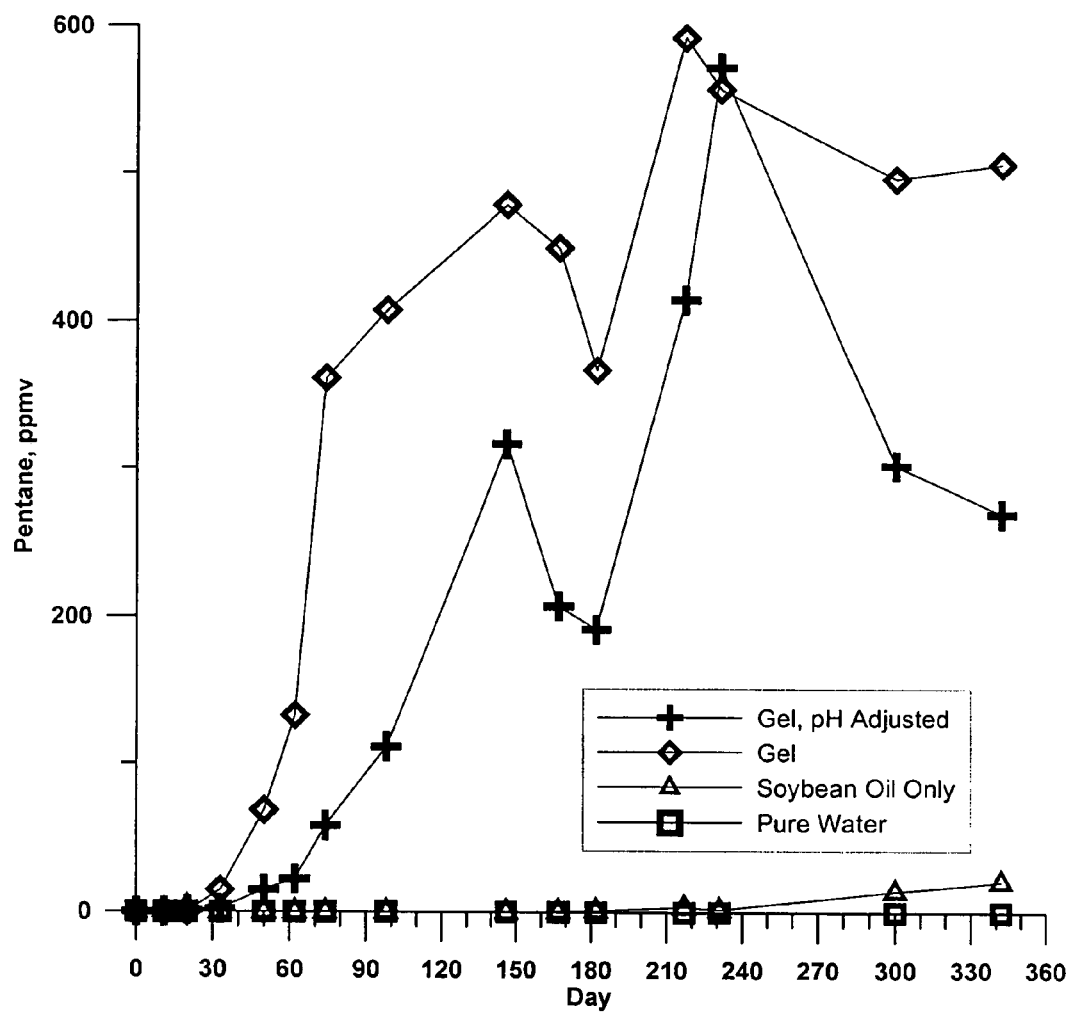

Set forth in FIG. 2, the conditions described above in FIG. 1 are used and evaluated for the evolution of venting gases. Venting gas is a measurement of microbial efficiency in converting the soy bean oil carbon source. As seen in FIG. 2, the respective gels show significant improvement in metabolism efficiency by microorganisms in comparison to neat soy bean oil or pure water. The decrease and then increase in the venting gas after day 140 is indicative of the natural progression of colonization by anaerobic microbes.

In addition to oil and gel, microcosm studies were conducting using variations of the types of gels as set forth in Table 1.

TABLE 1

| Sample Designation | Additive |
| --- | --- |
| Water (0.5 ml) | DI water only |
| Oil (0.5 ml) | Soybean oil only |
| Gel (1 ml) | 100 ml DI Water |
|  | 100 ml Soybean Oil |
|  | 4 g Cab-O-Sil (2%) |
| Yeast (1 ml) | 100 ml DI Water |
| (Nutrient 1) | 100 ml Soybean Oil |
|  | 4.07 g Cab-O-Sil (2%) |
|  | 2.07 g Yeast Extract |

TABLE 1-continued

| Sample Designation | Additive |
| --- | --- |
| Corn (1 ml) | 100 ml DI Water |
| (Nutrient 2) | 100 ml Soybean Oil |
|  | 4.05 g Cab-O-Sil (2%) |
|  | 2.72 g Corn Steep Powder |
| Combo (1 ml) | 100 ml DI Water |
| (Nutrient 3) | 100 ml Soybean Oil |
|  | 3.01 g Cab-O-Sil (2%) |
|  | 1.42 g Corn Steep Powder |
|  | 1.01 g Yeast Extract |

Evaluative microcosms were built using random soil core samples from 20 to 25 feet of core samples from tetrachloroethylene (PCE) contaminated soil from a site under the jurisdiction of the Savannah River National Laboratory. Each microcosm had approximately 2 cm$^3$ soil and the indicated volume of liquid identified in Table 1. Each microcosm had a 20 mil head space provided by a vial having a septum seal to facilitate gas chromatography analysis. It is noted that yeast extract and corn steep liquor powder were introduced as a source of nitrogen, phosphorus, and other micronutrients.

Figure 3:
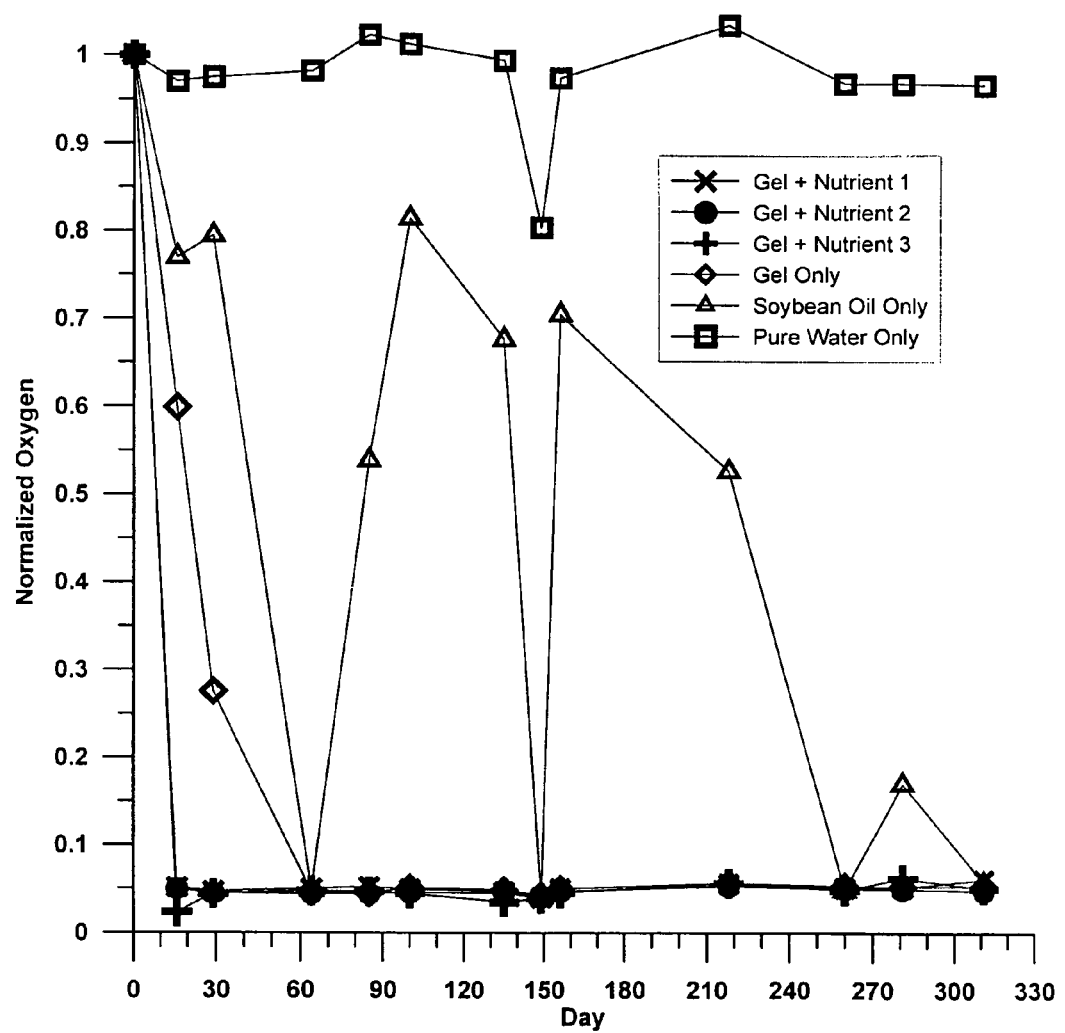

As set forth in FIG. 3, the data sets forth that the gel formation with nutrients provides a more rapid use of oxygen in comparison to gel without nutrients. In the nutrient containing samples, oxygen is completely depleted within two weeks. Since one approach of using a thixotropic gel within Vadose zones is to create an anaerobic environment, the inclusion of certain nutrients within the gel enables the anaerobic conditions to be established more quickly. In addition, it is possible to create an injectable gel which is anaerobic at the time of injection. For instance, sparging the thixotropic solution with nitrogen gas so that the solution is saturated with nitrogen will create a substantially anaerobic solution which is devoid of free oxygen.

Figure 4:
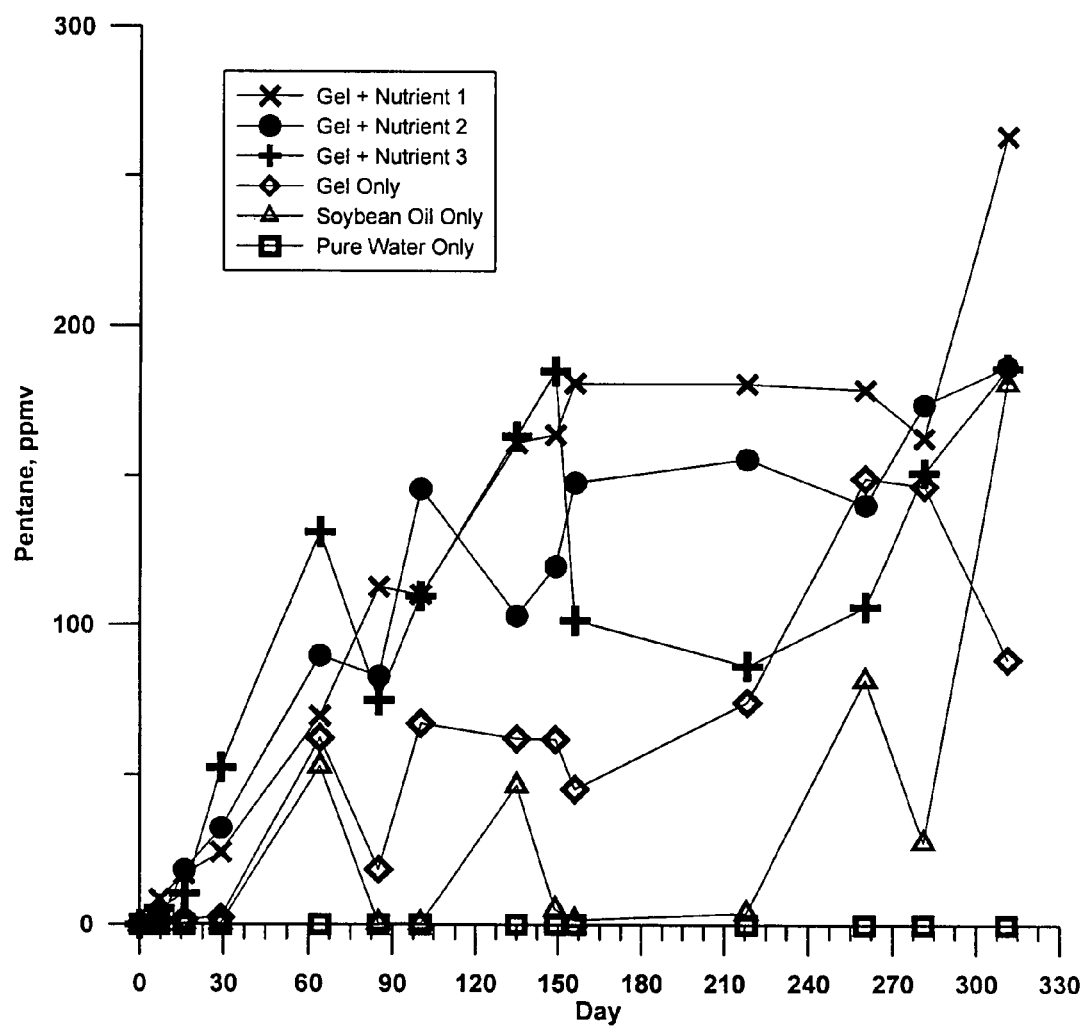

As seen in reference to FIG. 4, in comparison with FIG. 2, it is noted that pentane is generated at a slower rate since available oxygen is quickly depleted in samples having the supplemental nutrients. The generation of pentane is also indicative of the natural progression of colonization by anaerobic microbes. The slower metabolism of the soybean oil under anaerobic conditions increases the longevity of the gel as a treatment and barrier system.

Figure 5:
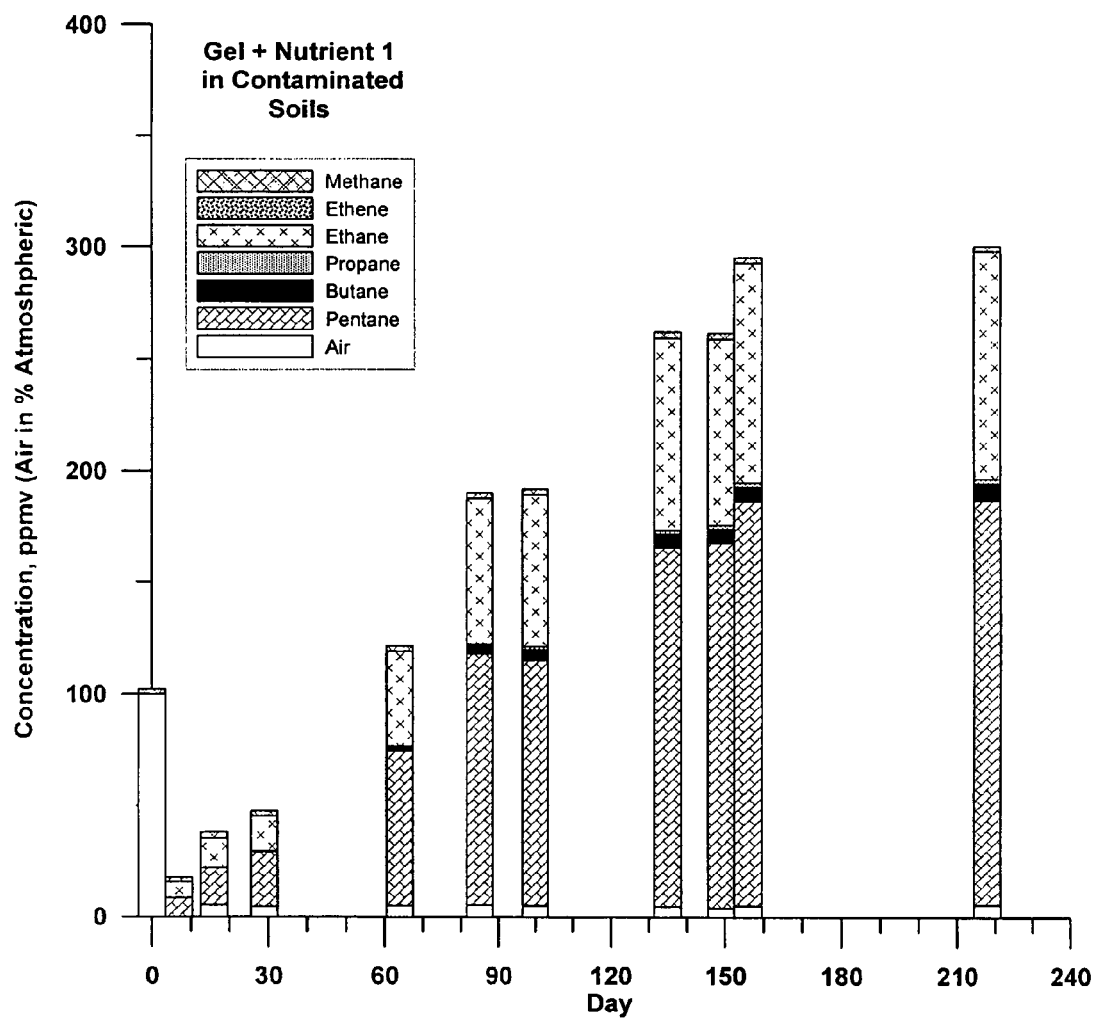
FIG. 5 is a graph setting forth the relative concentrations of various gases present within a soil/gel microcosm.

FIG. 5 sets forth the gaseous breakdown products in the nutrient gel housed within a soil microcosm. The components and relative concentrations of gaseous breakdown products is indicative of the natural progression from aerobic to anaerobic activity in the microcosm. It should be noted that separate measurements for oxygen are not reported, oxygen levels being below the detection limits and likely nonexistent.

Figure 6A:
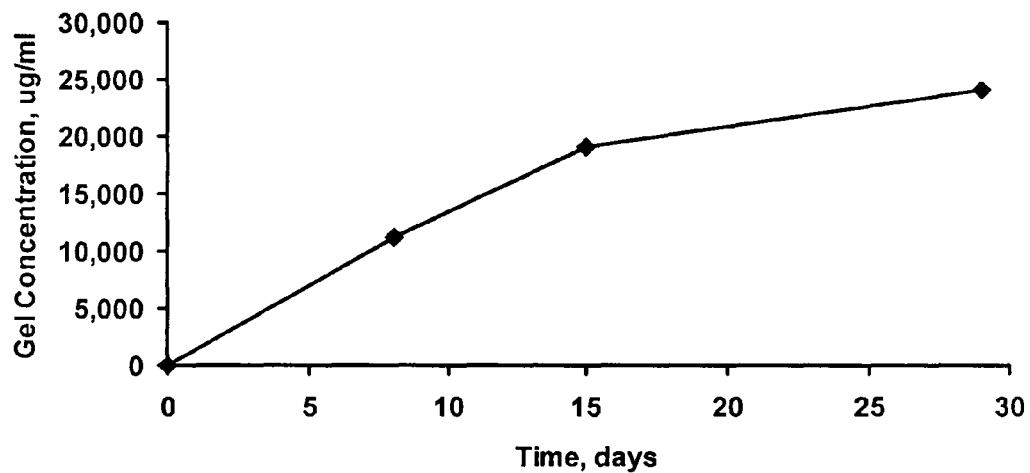
FIGS. 6A and 6B set forth aspects of partitioning/diffusion rates and distances within a thixotropic gel within a specific time frame.
Figure 6B:
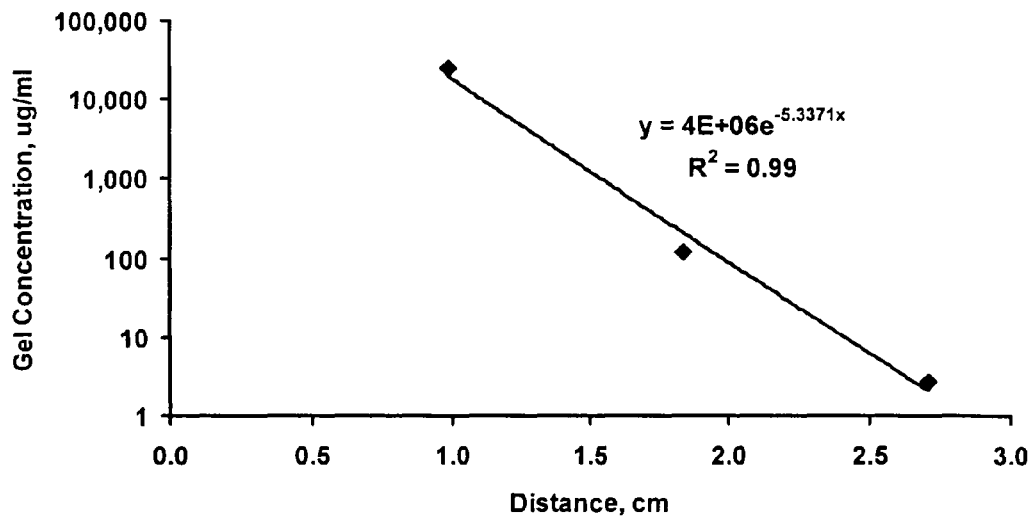

Partitioning and diffusion tests were also conducted to determine the effect of diffusion and partitioning on the overall process. Small columns were created that had a constant vapor concentration at the top of PCE (tetrachloroethylene) having a PCE concentration at vapor pressure. The experimental apparatus used support members to hold 3 plastic 5 mil syringes upright, a 10 mil volumetric flask, and a 2 quart glass jar. An oil gel of 50% water, 50% soy bean oil, and 1.2%/wt of Cab-O-Sil was used to construct the gel. The tops of the syringes were removed, the plungers pulled all the way out and filled with the oil gel. A 10 ml volumetric flask was then filled with PCE to the 10 ml mark and the flask was placed in the jar and then the syringes were placed in the jar with the flask. The jar was subsequently sealed and the 3 systems were sampled and analyzed for PCE concentrations at 7 day intervals as set forth in FIGS. 6A and 6B.

These data show a significant amount of PCE mass partitioning and diffusing into the gel formulation in short time period where active sequestration and degradation can occur. Other non-polar contaminants will behave similarly at different rates depending on their physical and chemical characteristics. These data show that once the gel has formed in the vadose zone, the oil fraction of the gel acts to absorb and sequester surrounding non-polar contaminants such as chlorinated solvents. The oil fraction of the gel continues to function as a sink for contaminants as the contaminants migrate through the mass of the gel by partitioning and diffusion. The ongoing sink maintains a beneficial diffusion gradient in the vadose zone such that contaminants will move from a higher concentration within the vadose zone to the oil component within the thixotropic gel.

Gel saturations useful for remediation are typically above 50 percent saturation. The desired at rest viscosity may be adjusted based upon soil permeability/porosity so as to meet the intended gel saturation levels. Higher permeability/porosity soils will require higher at rest viscosities to meet the intended saturation. Likewise, lower permeability/porosity soils would necessitate lower at rest viscosities. The at rest viscosity may be controlled by the amount of fumed silica which is incorporated into the gel.

By way of example, numerical modeling indicates that a medium sand with a moderate permeability requires an rest viscosity in the range of 100,000 to 500,000 cp for saturations of 55 to 85 percent. This could be met by a gel having an at rest viscosity of 50 percent non-toxic oil such as soybean oil and 50 percent water by volume in which 2 percent fumed silica such as Cab-O-Sil M5 (Cabot Corporation) by weight. The fumed silica is mixed under high shear rates with either the oil or water for an interval ranging from about 2 to about 8 minutes so as to create a homogeneous mixture. The remaining component of either oil or water is then added and mixed under high shear rates for about 2 to about 8 minutes to form a stable gel. The mixed formulation is stable and can be stored for significant time periods prior to injection into the vadose zone.

The vadose zone soils tested have a pH value which ranges from about 4 to about 5. Such pH ranges are too acidic and therefore detrimental to microbial processes. Therefore, low pH soils will require adjustment for optimal microbial activity. In addition, anoxic conditions and increases of carbon dioxide from microbial respiration can further decrease the pH in the soil. To promote microbial growth, a pH range should be near neutral though ranges between about 5 to about 9 following emplacement of the gel within the soil system can be used. To raise the pH, a buffer such as sodium bicarbonate, phosphates, sodium hydroxide or a combination thereof can be used in the water phase of the gel. For specific soils tested, $3 \times 10^{-4}$ mol/l of trisodium phosphate will raise the pH from 4 to a value greater than 6. One having ordinary skill in the art will recognize that the buffer concentration may be tailored to address specific vadose zone conditions.

Microbial cell mass growth requires a carbon source such as soybean oil along with oxygen, phosphorus, nitrogen, and various micronutrients. The gel composition and additives may be adjusted and controlled to determine the amount of resulting biomass which is formed. The remaining carbon source is used by the microbes for respiration to degrade the contaminants. The specific nutrient amendments of the gel may be adjusted to obtain a desired biomass to meet the bioremediation goals for the specific contaminants. Oversupply of nutrients can cause overgrowth of the microbes and clogging of the soil formation that can limit mass transfer of certain contaminants and increase the degradation rate of the oil. For the soil conditions and gel recipe described above, nitrogen and phosphorous ratios were added to convert 1 to 2% of the carbon in the soybean oil to biomass. The following stoichiometric equation is used to determine the appropriate ratios of nutrients to achieve the desired biomass per mass of soil to tailor the treatment for the subsurface conditions and suite of contaminants:

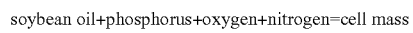

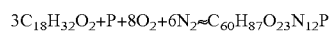

The remaining carbon is used for microbial respiration and will increase the longevity of the gel in the subsurface for treatment. One having ordinary skill in the art will recognize that the nutrient ratios may be tailored to address specific remediation goals.

Macronutrients can be supplied in the form of organic powders or liquids, inorganic salts and/or organic or inorganic fertilizers. While desired inorganic nutrients can be supplied to the injectable solution, the non-limiting examples set forth herein utilize the inclusion of organic materials which, in response to metabolic activity by microorganisms, will provide for a gradual release of certain nutrients such as nitrogen and phosphorus.

Figure 19:
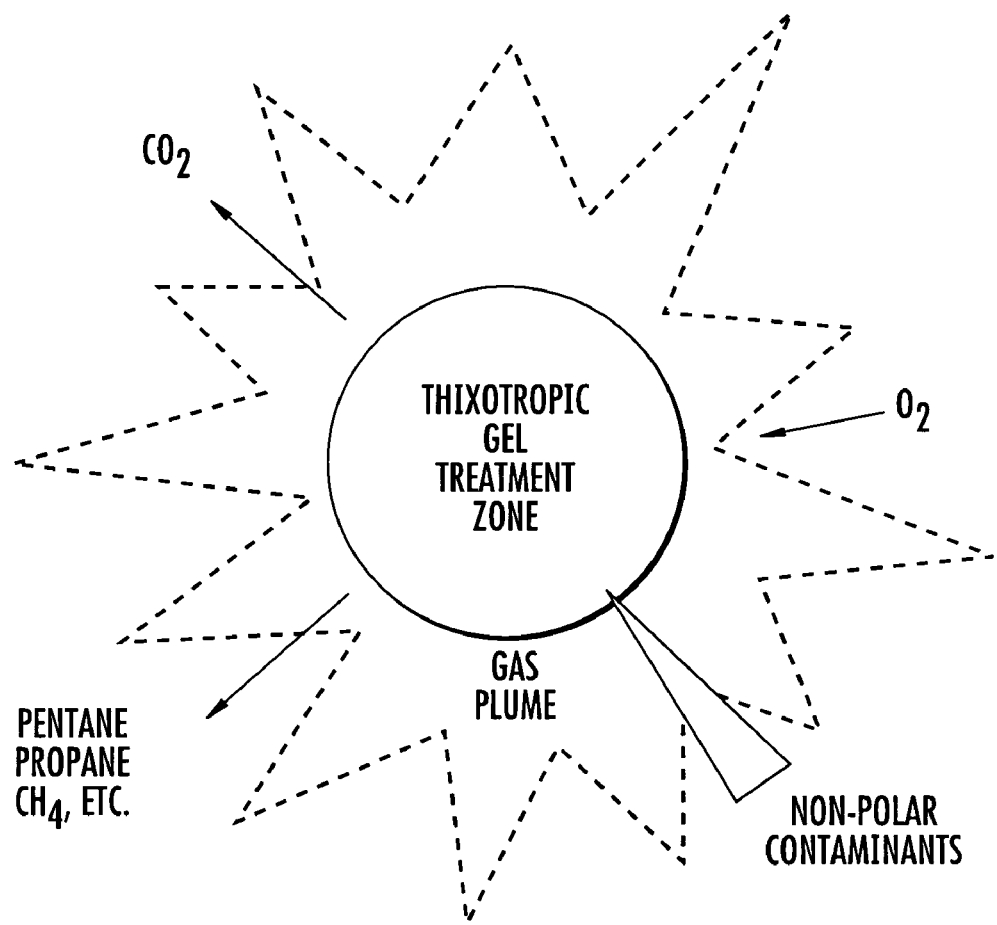
FIG. 19 is a drawing showing the diffusion gradients and migration patterns of various constituents and contaminants within the vadose zone relative to the thixotropic gel.

In addition, at the time of application to the vadose zone, other supplements including microorganisms, and growth supplements for the microorganisms may be added, the microorganisms selected for the particular contaminants to be treated. For instance, if an anaerobic thixotropic gel is being utilized, appropriate anaerobic microorganisms can be entrained into the thixotropic solution prior to injection in the vadose zone. Once the gel has formed in the vadose zone, the oil fraction of the gel acts to absorb and sequester surrounding non-polar contaminants such as chlorinated solvents. The oil fraction of the gel continues to function as a sink for contaminants as ongoing microbial degradation of VOCs, chlorinated solvents, and other contaminants occur. The ongoing degradation maintains a beneficial diffusion gradient in the vadose zone such that contaminants will move from a higher concentration within the vadose zone to the oil component within the thixotropic gel as illustrated in FIG. 19.

The stabilized injected gel also maintains higher water content within the gel which supports enhanced levels of microbial activity. The combination of improved microbial conditions along with the increased concentration of contaminants allows for an effective combination of bioremediation to occur.

Additional benefits of the applied vadose gel are that the gel acts as a barrier to intercept and incorporate downward migration of rain water through the vadose zone. By preventing/limiting the downward migration through the vadose zone, additional contamination of the ground water is minimized. As a result, the contaminants are sequestered in a smaller area and in a substrate that lends itself to bioremediation. Further, the gel has a much greater permanence, i.e., non-migratory, than non-thixotropic materials such as neat vegetable oils that have been used in the past. This provides a greater resistance to the thixotropic gel and allows for a longer duration of beneficial reaction between the gel, colonized microorganisms, and contaminants which migrate into or are associated with the injected gel.

The thixotropic material also lends itself as a material and a process useful for the remediation of heavy metals and metal contaminants. It is well known in the art that numerous in situ technologies can be utilized to remediate heavy metal contamination. Such techniques include establishing favorable pH environments in the subsurface soils, the addition of chelating agents to precipitate heavy metals, and the introduction and/or facilitation of microbial populations whose metabolic activities will transform heavy metals into a less migratory chemical species or into a chemical form that is less harmful. The thixotropic gel provides a useful matrix in which a favorable vadose zone environment for the sequestration and/or transformation of heavy metals may occur.

For instance, the gel matrix can be sufficiently buffered so as to provide favorable pH ranges needed to bring about chelation or precipitation of heavy metals. Further, useful bacteria that have established themselves as effective in bioremediation of heavy metals can be entrained into the thixotropic solution prior to injection. The combination of the desired microorganisms, beneficial pH, and any other supplemental nutritional or reactive agents useful in heavy metal remediation can be included into the thixotropic gel material.

By way of example, the thixotropic material may include oxygen releasing metal peroxides as taught in U.S. Pat. No. 7,160,471 which is commonly assigned and which is incorporated herein by reference. In addition, various bacterial strains as disclosed in U.S. Pat. No. 6,923,914 assigned to Global Biosciences, Inc., can be incorporated into the thixotropic solution to bring about remediation of heavy metals in situ including aerobic, anaerobic, or dual aerobic/anaerobic conditions. U.S. Pat. No. 6,923,914 is incorporated herein by reference.

Injection simulations were conducted to investigate potential subsurface distribution patterns and flow behavior of VOS (Vadose Oil Substrate—thixotropic gel) under field conditions. A numerical model capable of simulating multiphase flow of a power law, non-Newtonian fluid (thixotropic) was developed by modifying T2VOC source code. T2VOC is a fully implicate, integral finite difference simulator for multiphase flow and heat transfer in porous media (Falta et al., 1995). As a general rule, the injected gel is distributed within the vadose zone along the path of least resistance. Accordingly, fractures that may occur within the vadose zone will tend to be filled by the injected thixotropic gel material. Likewise, where a more porous soil, such as loose sand, is present, a greater penetration of the thixotropic gel will occur in the more porous substrate as opposed to surrounding, denser soil layers. Irrespective of initial soil porosity, the injected gel demonstrates a great deal of permanency with respect to downward or lateral flow as seen in neat vegetable oil substrates which tend to migrate in response to gravity or along less permeable geologic formations within the subsurface.

Viscosity ($\mu$) is a measure of the resistance of a fluid to deform (shear rate ($\gamma$)) under a stress (shear stress ($\tau$)). Viscosity remains constant under different shear stress conditions for most fluids. These fluids are termed Newtonian, and the shear viscosity-shear stress relationship can be described as $$\mu = \frac{\tau}{\lambda}$$

VOS gels are power-law non-Newtonian fluids. Non-Newtonian fluids are those for which viscosity changes as a function of applied shear rate. For a power-law non-Newtonian fluid the relationship between shear stress and shear rate is described as $$\tau = H\gamma^n$$

and according to Ikoku and Ramey, 1980

$$\mu = H\gamma^{(n-1)} \tag{1}$$

where H is the consistency index and n is the flow index. H and n are curve fitting parameters that are obtained by fitting viscosity verses shear rate data.

This evaluation was composed of 3 parts. One part involved preparing gel mixtures and testing viscosity properties. Another involved developing the numerical code. Lastly the code was implemented to investigate subsurface behavior of VOS under field conditions.

Laboratory Tests

The thixotropic gel was prepared by mixing 1:1 ratios of water and soybean oil along with various amounts of Cab-O-Sil™ fumed silica. Three mixtures were prepared, each containing 500 ml of water and 500 ml of vegetable oil. The different mixtures contained 6, 12, and 18 g of Cab-O-Sil, labeled 0.6%, 1.25%, and 1.86% respectively based on the mass ratio of Cab-o-Sil contained (vegetable oil density=0.9 g/ml). The 0.6% mixture contained too little Cab-o-Sil to retain a homogeneous consistency after preparation and was not tested.

Figure 7A:
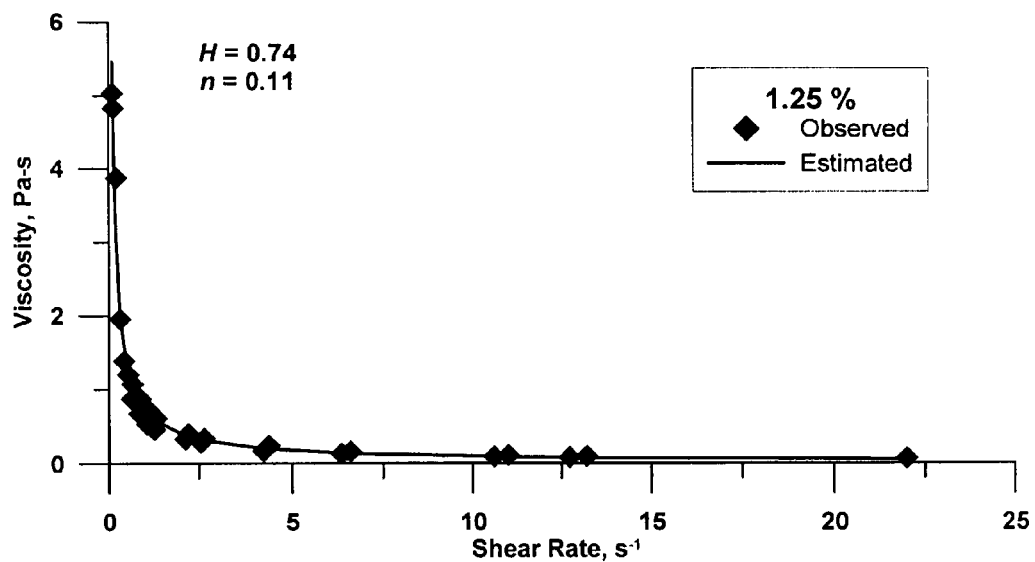
FIGS. 7A and 7B set forth graphs showing viscosity parameter fitting values of various thixotropic gel solutions.
Figure 7B:
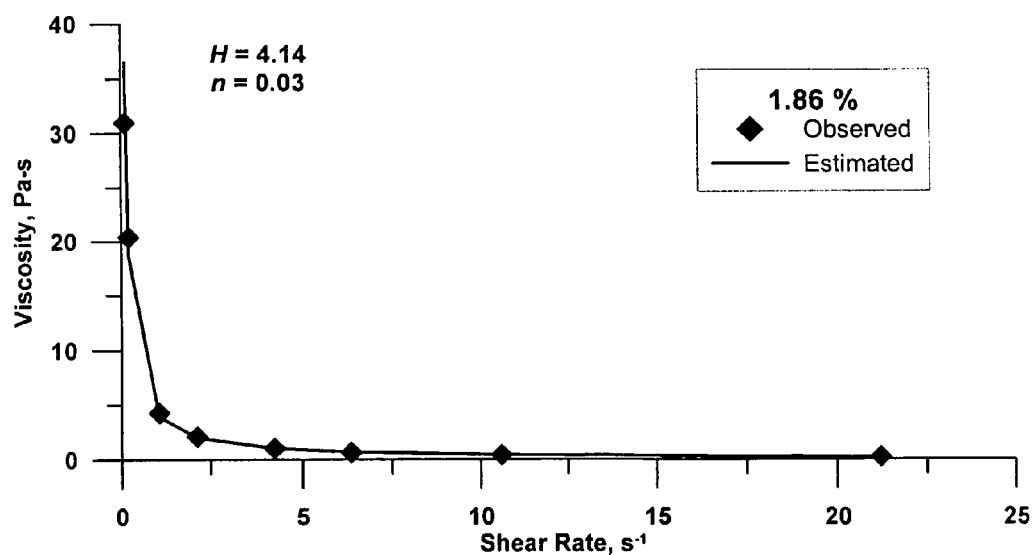

A Brookfield Gardner DVE Viscometer (model LV) was used to measure fluid viscosity at various applied shear stresses using spindles LV-2C and LV-3C (Table 2). The data was then fit using Equation 1 to obtain values for H and n (FIGS. 7A & 7B).

TABLE 2

| 1.25% | | 1.86% | | | |
|---|---|---|---|---|---|
| Shear Rate ($s^{-1}$) | Viscosity (Pa * s) | Shear Rate ($s^{-1}$) | Viscosity (Pa * s) | Shear Rate ($s^{-1}$) | Viscosity (Pa * s) |
| 0.11 | 5.03 | 2.12 | 0.33 | 1.07 | 30.96 |
| 0.13 | 4.83 | 2.20 | 0.41 | 1.02 | 20.37 |
| 0.21 | 3.88 | 2.54 | 0.29 | 0.82 | 4.27 |
| 0.32 | 1.95 | 2.64 | 0.34 | 0.41 | 2.09 |
| 0.42 | 1.38 | 4.24 | 0.17 | 0.29 | 1.03 |
| 0.53 | 1.20 | 4.40 | 0.24 | 0.25 | 0.65 |
| 0.64 | 0.88 | 6.36 | 0.13 | 0.19 | 0.41 |
| 0.66 | 1.07 | 6.60 | 0.16 | 0.23 | 0.22 |
| 0.85 | 0.68 | 10.60 | 0.09 | | |
| 0.88 | 0.88 | 11.00 | 0.11 | | |
| 1.06 | 0.54 | 12.72 | 0.08 | | |
| 1.10 | 0.73 | 13.20 | 0.10 | | |
| 1.27 | 0.46 | 22.00 | 0.07 | | |
| 1.32 | 0.62 | | | | |

Model Development

Modifications were made to T2VOC source code to enable simulation of power-law non-Newtonian fluid flow in porous medium. The methodology implemented is based on that presented in Wu and Pruess, 1997.

The viscosity of a non-Newtonian fluid is a function of shear rate. Shear rate cannot be directly calculated within the framework of existing numerical flow simulators, however, Gogarty, 1967 has shown that shear rate depends solely on fluid pore velocity in porous materials. The pore velocity is a function of local potential gradient, permeability, and, in multiphase systems, fluid saturation. The multiphase extension of the non-Newtonian power-law function is $$\mu = \mu_{eff}\left(\frac{kk_r}{\mu_{eff}}(|\nabla\Phi|)\right)^{\frac{n-1}{n}} \tag{2}$$

and, $$\mu_{eff} = \frac{H}{12}\left(9 + \frac{3}{n}\right)^n [150kk_r\phi(S - S_{ir})]^{\frac{1-n}{2}} \tag{3}$$

where k is formation permeability, $k_r$ is relative permeability, $\nabla\Phi$ is potential gradient, $\phi$ is porosity, S is non-Newtonian saturation, and $S_{ir}$ is irreducible non-Newtonian fluid saturation.

As potential gradient approaches zero the viscosity from Equation 2 goes to infinity. Therefore, to maintain numerical stability viscosities for given permeability and saturation conditions are linearly extrapolated from some small gradient back to zero gradient. This is done using $$\mu = \mu_1 + \frac{\mu_1 - \mu_2}{\delta_1 - \delta_2}(|\nabla\Phi| - \delta_1) \quad (4)$$

and, $$\mu_j = \mu_{\mathit{eff}}\left(\frac{k}{\mu_{\mathit{eff}}}\delta_j\right)^{\frac{n-1}{n}} \quad (j=1,2)$$

where $\delta_1$ is slightly greater than $\delta_2$. For this work $\delta_1$ was assigned a value of 10 Pa/m and $\delta_2$ was assigned a value of 9.999999 Pa/m. The linear extrapolation method was applied when $\nabla\Phi$ was less than or equal to 10 Pa/m. Due to the numeric storage limitations for positive double precision values on a 64-bit processor (2.2E±308), lower limits had to be placed on S and $k_r$ values so that Equation 3 would not produce an undefined result (zero raised to a negative power). Therefore, S and $k_r$ values that were less than 1E-15 were assigned values of 1E-15. This prevents the problem described above but has a negligible effect on the viscosity calculation because under these conditions the potential gradient would be small and Equation 4 is implemented.

Figure 8:
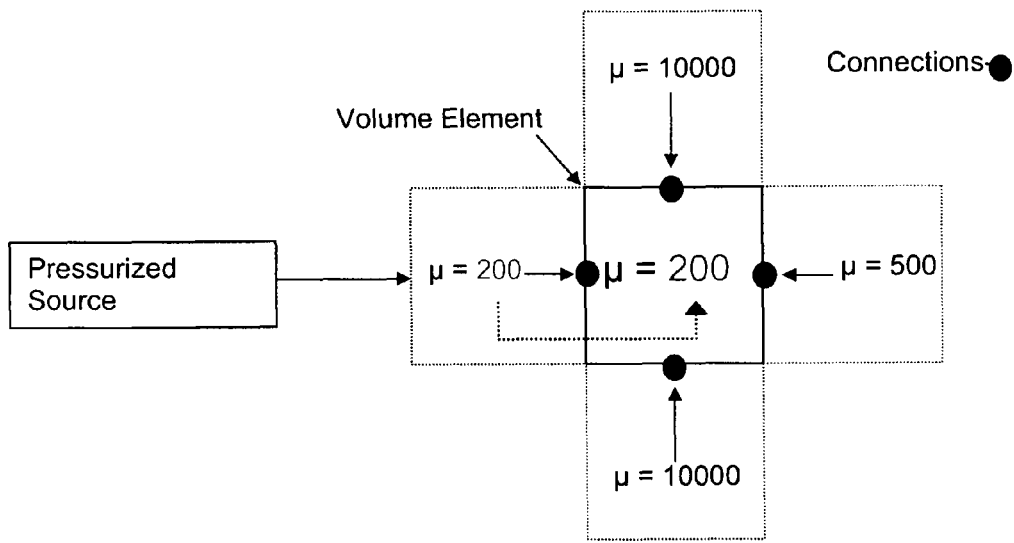
FIG. 8 and FIG. 9 illustrate calculations used to determine viscosity values for non-Newtonian (thixotropic) simulations.

T2VOC calculates the viscosity for Newtonian fluids as a function of temperature for each individual volume element. To simulate non-Newtonian flow, however, viscosity had to be calculated for each volume element interface because the potential gradient must be known to implement Equation 2. A method had to be created for assigning each volume element a viscosity value in order to present spatial viscosity distribution results from simulations. In the cases presented each volume element was assigned the lowest viscosity value calculated for any of the volume element interfaces (FIG. 8). This basically equates to an upstream (with respect to gradient vector direction) weighting of viscosity values.

Figure 9:
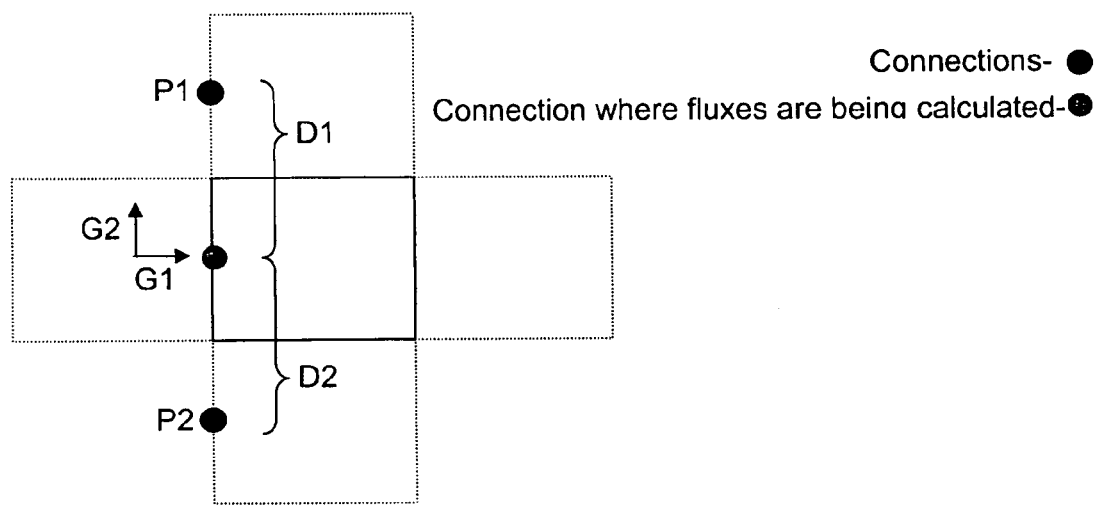

T2VOC calculates gradients perpendicular to grid cell interfaces to obtain phase fluxes across those interfaces. These gradients, however, represent a component of the total gradient across a grid cell. According to Equation 2 viscosity of a power law fluid is a function of the total gradient at any given point. Therefore the total gradient had to be estimated at each grid cell interface to estimate viscosity (gradient components are still used to calculate fluxes). The complementary gradient component was obtained by dividing the pressure differential of the grid cell connections to either side by the distance between the points (FIG. 9). The total gradient is then calculated using Pythagoreans Theorem (FIG. 9).

The model validation process involved a simulation of Newtonian fluid displacement by a non-Newtonian fluid. The results of the simulation were compared to the results of an analytical solution from an extension of the Buckley-Leverett method (Wu et al, 1991). The numerical simulation is a reproduction of the verification method used in Wu and Pruess, 1997. The grid is one dimensional with 720 grid blocks that are 1 m in the y and z-directions and 0.0125 m in the x-direction. The injection, formation, and fluid properties used are given in Table 3. Capillary effects were assumed to be negligible.

Figure 10:
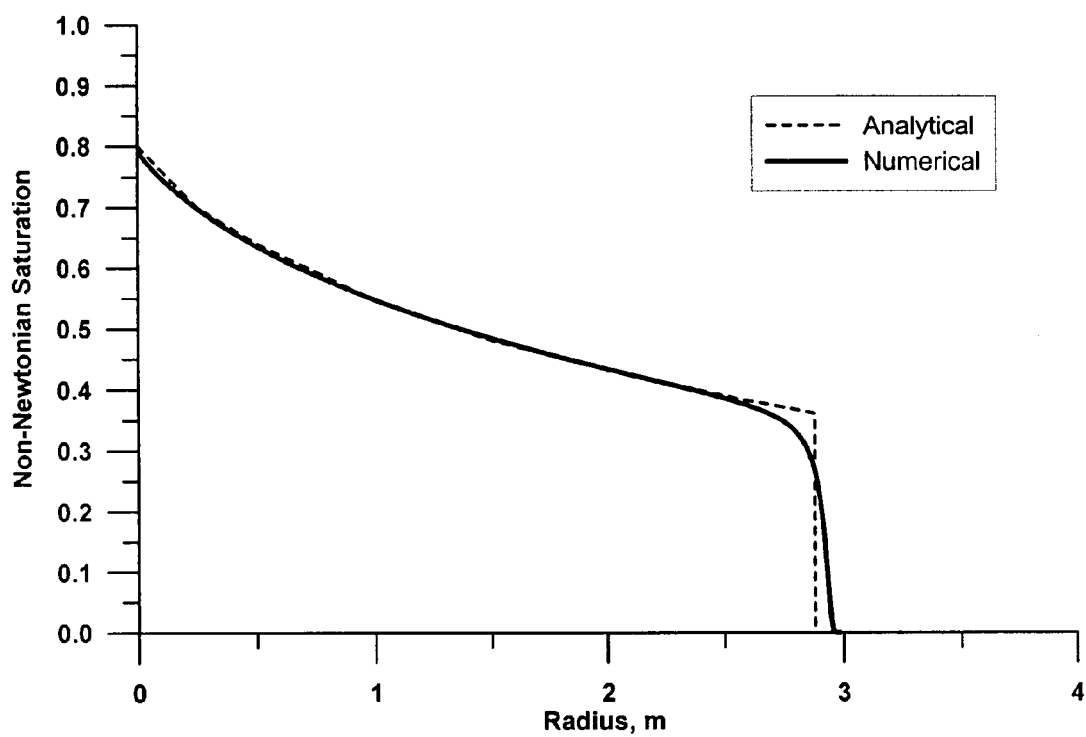
FIG. 10 is a graph of a non-Newtonian saturation data comparing analytical and actual values.

Comparison of the two resulting data sets shows that the numerical model closely predicts the results of the analytical model (FIG. 10). There is, however, slight disagreement near the "wetting" front of the non-Newtonian fluid. This is due to numerical dispersion and is to be expected.

TABLE 3

| | |
|---|---|
| Porosity = | 0.2 |
| Permeability = | 1 Darcy |
| Injection rate = | 8.233E–5 $m^3 s^{-1}$ |
| Injection time = | 10 h |
| Newtonian fluid viscosity = | 5 cP |
| Irreducible Newtonian saturation = | 0.2 |
| Irreducible non-Newtonian saturation = | 0 |
| Flow index = | 0.5 |
| Consistency index = | 0.01 Pa * $s^n$ |
| Relative permeability of non-Newtonian phase = | $1.17(S)^2$ |
| Relative permeability of Newtonian phase = | $0.75(1 - 1.25S)^2$ | note (S is non-Newtonian fluid saturation)

Model Properties

The same 2-D radial grid was used for all simulations. The grid is composed of 76 columns comprising a 121 m radius and 79 rows comprising a depth of 42 m with 1 m of atmosphere located at the top. The 5 ft (1.5 m) well screen is represented by the first grid blocks in 15-0.1 m rows located from 14.5 to 16 m (13.5 to 15 m bgs). The 17 rows above and below the well screen location are assigned thicknesses of 0.1 m and then become thicker (up to 1 m) in either direction. The columns up to a 5 meter radius are 0.1 m wide and then widen (up to 20 m) to a radius of 121 m.

Initial pressure and saturation conditions were estimated for each grid block assuming that the water table is located at 45 m bgs and that atmospheric pressure is equal to 103100 Pa. The model was then run for a simulation time of 30,000 years to ensure that a very nearly steady state water saturation distribution was reached. The steady state initial conditions were then incorporated into the model and the top row (atmosphere), bottom row, and largest radius column grid blocks were set to a constant condition state for all simulations.

Five different representations of formation material were used during modeling for this investigation. A range of formation materials from sandy to clayey were represented (permeabilities=$1\times10^{-11}$, $1\times10^{-12}$, $1\times10^{-13}$, $1\times10^{-14}$, and $1\times10^{-15}$ $m^2$). In each case the capillary pressure function parameters were adjusted to simulate actual properties for each material type. When making reference to a particular formation material the nomenclature used is 1E-11 $m^2$, 1E-12 $m^2$, etc.

Modeling Results and Discussion

Numerical models were designed to characterize the behavior of VOS in the subsurface during injection and post-injection drainage periods around a conventional well with a 5-ft screen. When appropriate the results from VOS simulations are compared to a baseline case. The baseline case involves injection of 100% vegetable oil, which was experimentally determined to be a Newtonian fluid with a viscosity of 46 cP. The viscosity parameters used for the gel injection simulations correlate to those obtained from fitting the 1.25% mixture (H=0.74, n=0.11) (FIGS. 7A & 7B). It was determined that the 1.86% mixture is too viscous to facilitate practical field application; therefore, simulations for this mixture were not performed.

Constant Pressure Injection Simulations

Simulations were conducted that predicted flow rates into a well, the viscosity distribution, and the saturation distribution of VOS and vegetable oil during constant pressure injection (FIGS. 11A, 11B, 12A, 12B, 13, 14). 10 hour long injections were simulated at 15 and 30 psi assuming a sandy type of formation material (1E-12 m$^2$). These simulations were constructed assuming that a sand pack was not present. The pressure indicated represents the simulated pressure at the top of the well screen, therefore, the fluid density and well screen depth must be considered when estimating the actual pressure applied at ground surface.

Figure 11A:
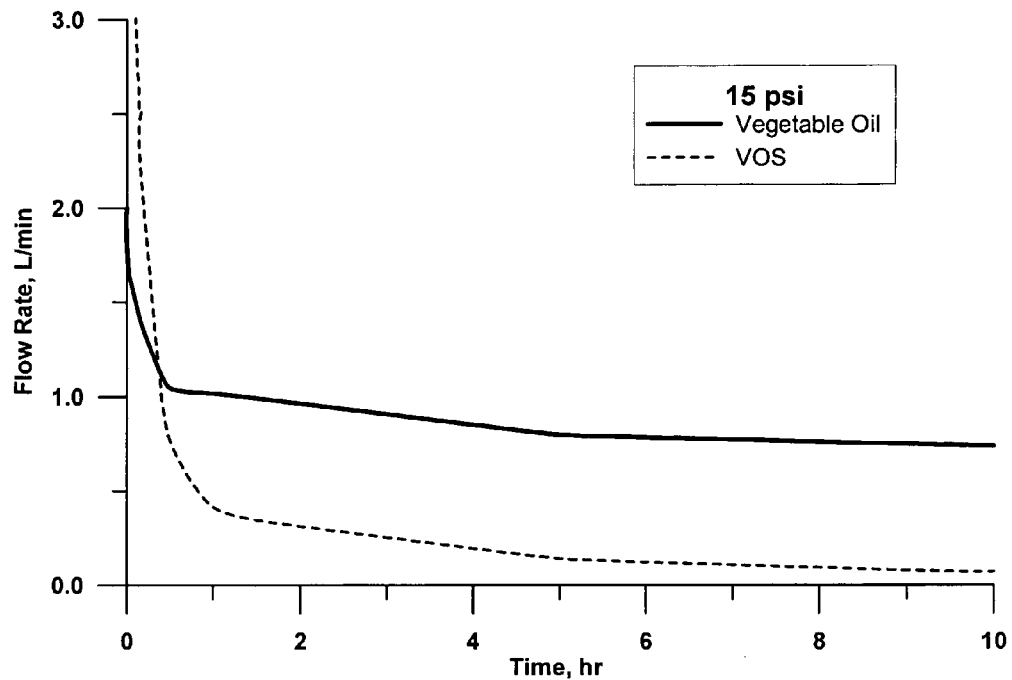
FIGS. 11A and 11B, FIGS. 12A and 12B, and FIGS. 13 through 16 set forth various physical property data on injected gel materials over time.
Figure 11B:
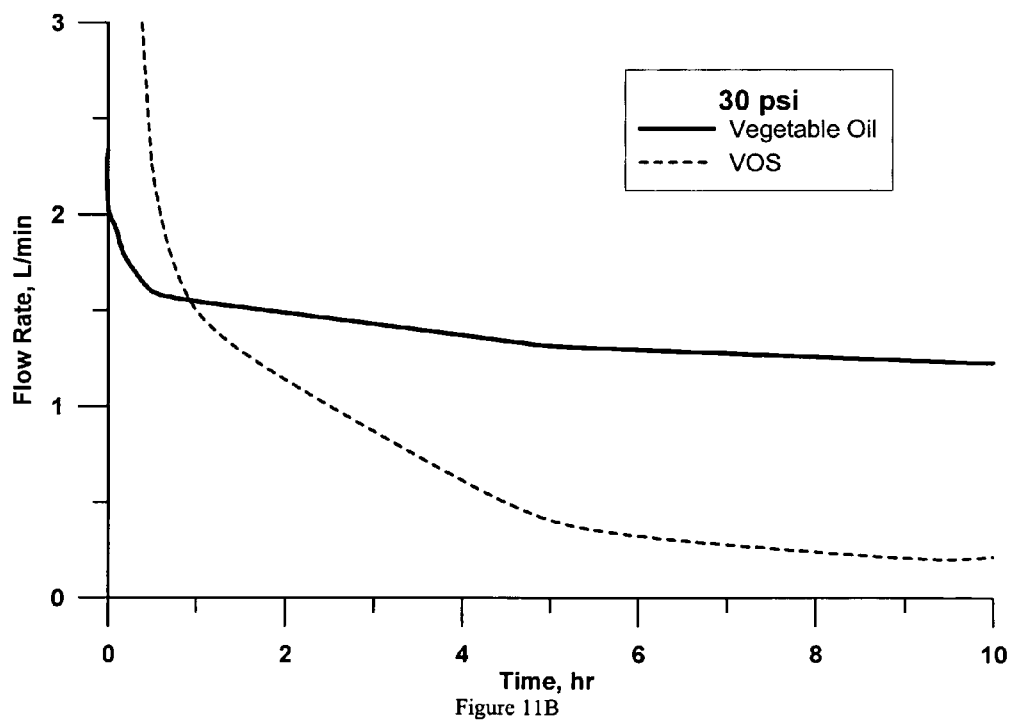

In both the 15 and 30 psi cases the VOS and vegetable oil flow rates were high at early times and then decreased as injection continued (FIGS. 11A and 11B). The rate at which the VOS flow rates decreased was consistently greater than the rate at which the vegetable oil flow rates decreased. VOS flow rates were actually greater than the vegetable oil flow rates at very early times, however, within a short period of time (30 min to 1 hr) the VOS flow rates decreased to 10 to 20% of the vegetable oil flow rate under the same injection conditions (FIGS. 11A and 11B).

Decreasing flow rate with time is to be expected when injecting a fluid into the unsaturated zone. When injecting a fluid under these conditions the volume of fluid saturated formation around the well screen increases with time. As this happens, the fluid mass that must be displaced by newly injected fluid increases. This causes the flow rate to decrease under constant pressure conditions. This trend is more pronounced during thixotropic gel injection simulations due to the method used to calculate viscosity (Equation 2). According to this method viscosity has an inverse-exponential relationship with potential gradient (exponent is negative). When injection is initialized the potential gradient at the well screen-formation interface is very large, therefore, the fluid viscosity is very low and the flow rate is large. As injection time increases the radius of fluid saturated formation around the well screen increases. The injection pressure is constant, and the fluid pressure at the wetting front of the fluid saturated formation volume remains constant (near atmospheric pressure). This means that the total pressure drop over the saturated radius remains constant, therefore, as radius increases the overall average gradient decreases. Decreases in gradient cause increases in fluid viscosity (Equation 2) and, therefore, decreases in flow rate.

Figure 12A:
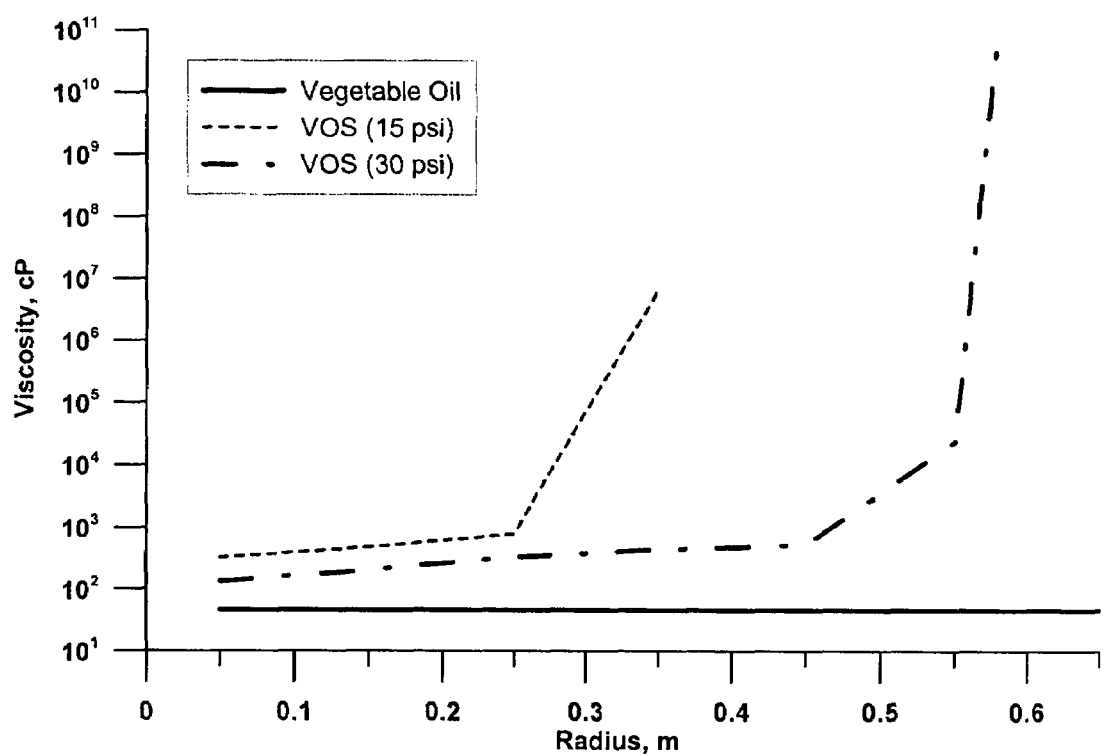
Figure 12B:
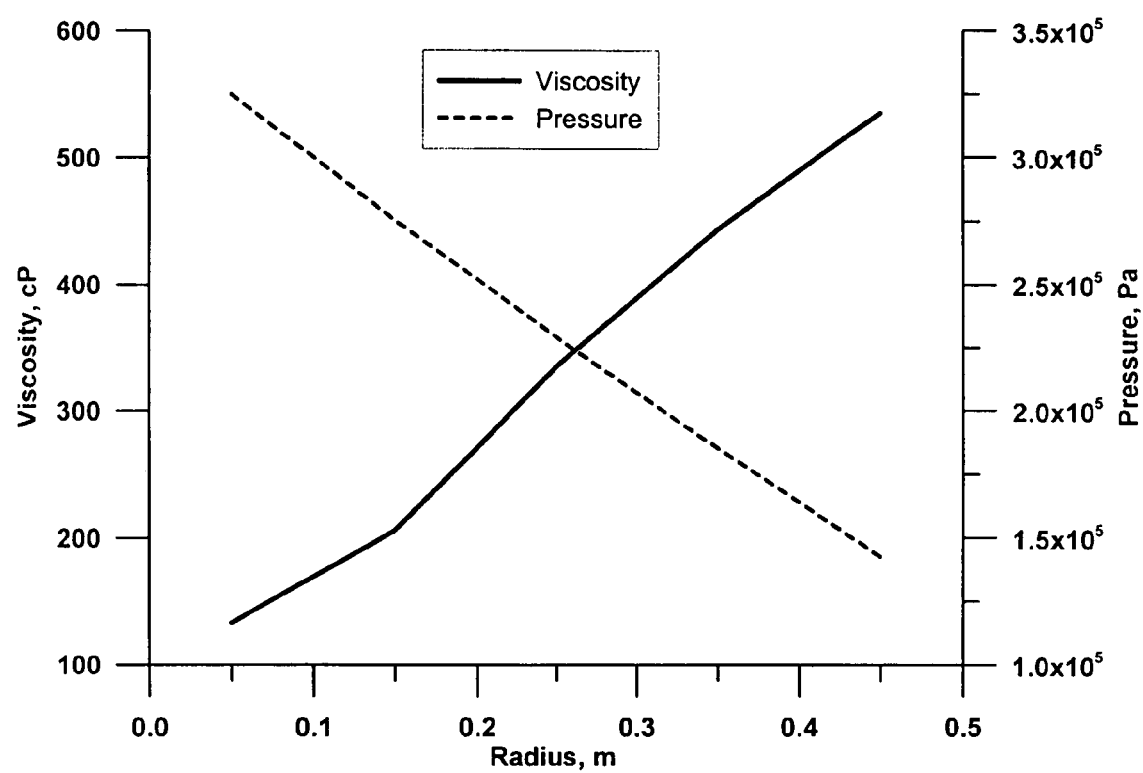
Figure 13:
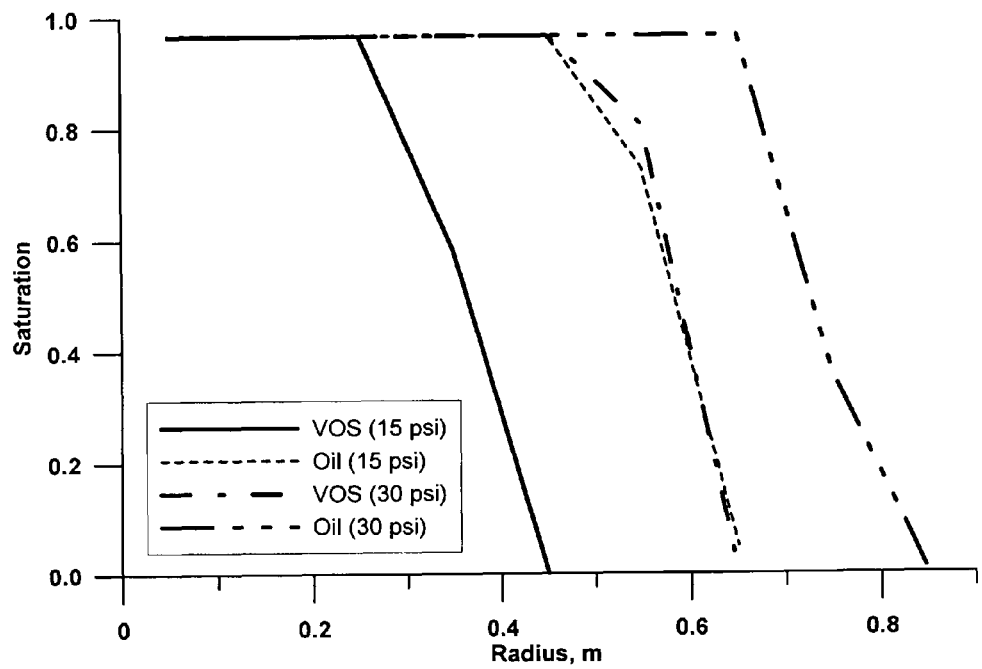

FIGS. 12A, 12B, and 13 show plots of property values with radius at a location near the center of the well screen after 10 hours of injection. The overall fluid viscosity in the system increases with time due to the scenario described above, however, viscosity also increases with radius away from the well screen (FIGS. 12A & 12B). Overall, the viscosity values for VOS during the 30 psi simulation are less than those from the 15 psi simulation due to an increase in the overall potential gradient in the system. In both cases the viscosity increases with radius away from the well screen with an abrupt jump near the gel-wetting front (FIG. 12a). The jump is due to the fact that viscosity has an inverse-exponential relationship with relative permeability (Equation 2). Near the wetting front the fluid saturation decreases, causing a decrease in relative permeability and thus an increase in fluid viscosity. If the abrupt jump in viscosity near the wetting front is ignored, plots show that viscosity increases with radius (FIG. 12b) over the region where fluid saturation remains fairly constant (FIG. 13). This can be explained by observing how fluid pressure changes with radius (FIG. 12b). Fluid pressure decreases as radius increases.

For purposes of calculating viscosity, however, it is not the value of fluid pressure that is important. Rather, it is the slope of the fluid pressure with radius line at any given point that dictates viscosity under constant saturation (and therefore constant relative permeability) conditions. The slope (potential gradient) slightly decreases with radius. Small differences in slope cause comparatively large changes in fluid viscosity (FIG. 12b) due to the exponential relationship between potential gradient and viscosity in power-law fluids (Equation 2). The viscosity for Newtonian fluids such as vegetable oil is not affected by shear stress, and therefore remains constant (FIGS. 12A & 12B).

As VOS or vegetable oil is injected into a formation it fills pore spaces by displacing water and air. The assumed wetting phase hierarchy in T2VOC simulations is Water>NAPL>Air. Therefore air is completely displaced by a NAPL (VOS, vegetable oil) phase, whereas water is not. The saturation that remains after a NAPL wetting front moves through a particular volume of formation material is dependent upon the minimum residual water content and capillary pressure properties of the formation. In this case a permeable formation material is believed to occur where the minimum residual water content is zero and the resulting capillary pressure differences are small. Therefore, the NAPL saturations behind the wetting front are large (0.97) with capillarity accounting for a small water saturation (0.03) (FIG. 13).

The maximum radius reached by an injected fluid is dependent on the average flow rate over the injection period, and to a lesser extent on the geometry of the fluid bearing volume of formation. Average flow rate decreases as injection pressure decreases; therefore, in both cases the maximum radii reached are larger for the 30 psi injections than for the 15 psi injections (FIG. 13). The fluid viscosity during injection is greater on average for VOS than for vegetable oil. This accounts for the flow rate differences (FIGS. 11A and 11B) that allow vegetable oil to reach larger radii under the same injection conditions (FIG. 13). Ten hours of injection at 15 psi produces radii of 0.35 and 0.65 m for VOS and vegetable oil respectively, whereas ten hours of injection at 30 psi produces radii of 0.65 and 0.85 m respectively (FIG. 13).

Effects of Formation Permeability

The radial distance reached by VOS under various injection conditions is of particular interest. A set of homogeneous formation simulations were created using the four different sets of formation material properties to investigate the affect of formation material composition on saturation with radial distance from the well. Simulations involved injecting VOS at 30 psi over a period of 10 hours.

Figure 14:
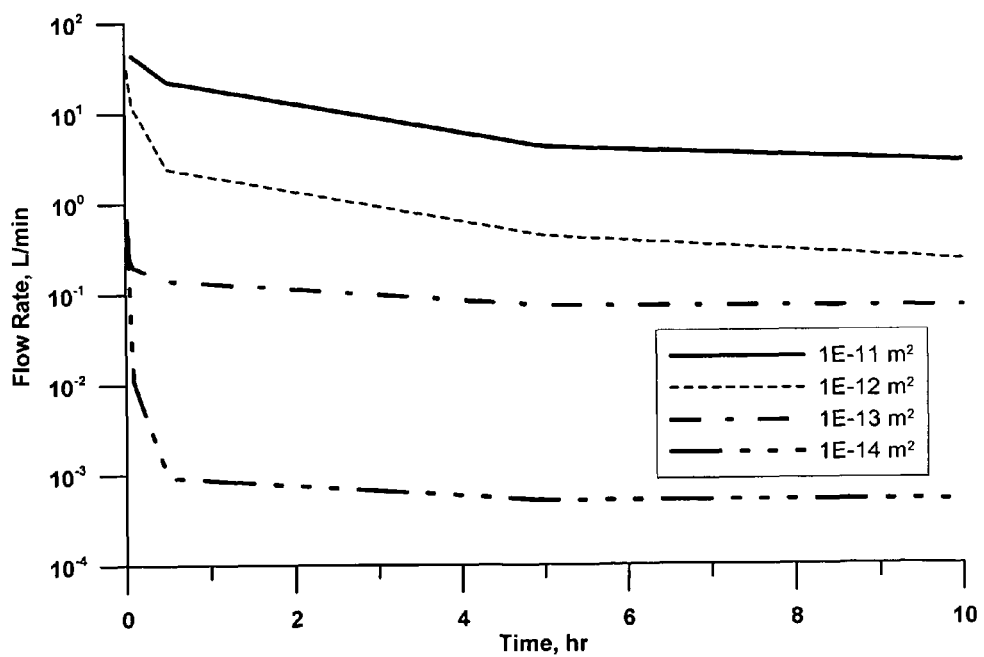

In general the flow rate with time results based on formation material type were as expected, in that the overall flow rate decreased as formation permeability decreased (FIG. 14). In each case the flow rate is greater at early times and decreases as injection continues. The rate at which flow decreases during early times is slightly greater for the lower permeability cases (1E-13 and 1E-14 m$^2$). The most likely explanation for this difference is the varying effect of capillary pressure function parameters, porosity, and residual water saturation, which are more extreme for these materials.

Figure 15:
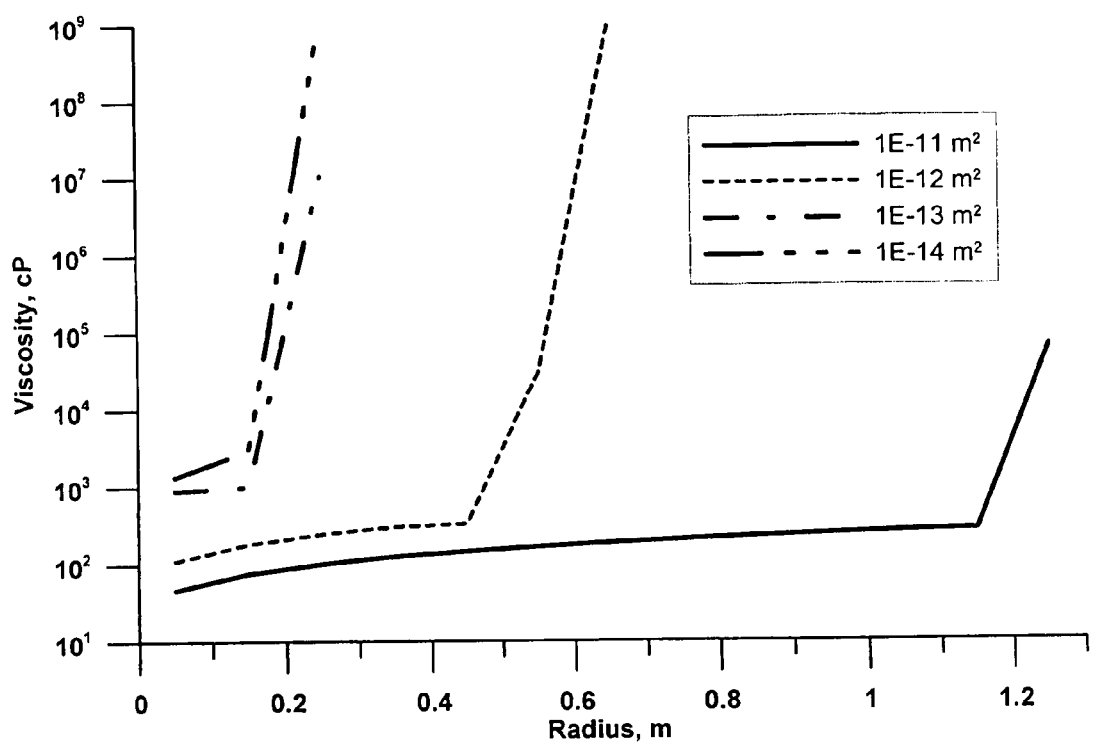

The overall average value of fluid viscosity increases as formation permeability decreases when injecting a shear-thinning power law fluid (FIG. 15). This is due in part to the fact that viscosity has an inverse exponential relationship with permeability (Equation 2). The gradient at any given point in the NAPL bearing volume also decreases with permeability because the entire volume up to the wetting front is maintained at a higher pressure (abrupt drop in pressure at the wetting front).

Figure 16:
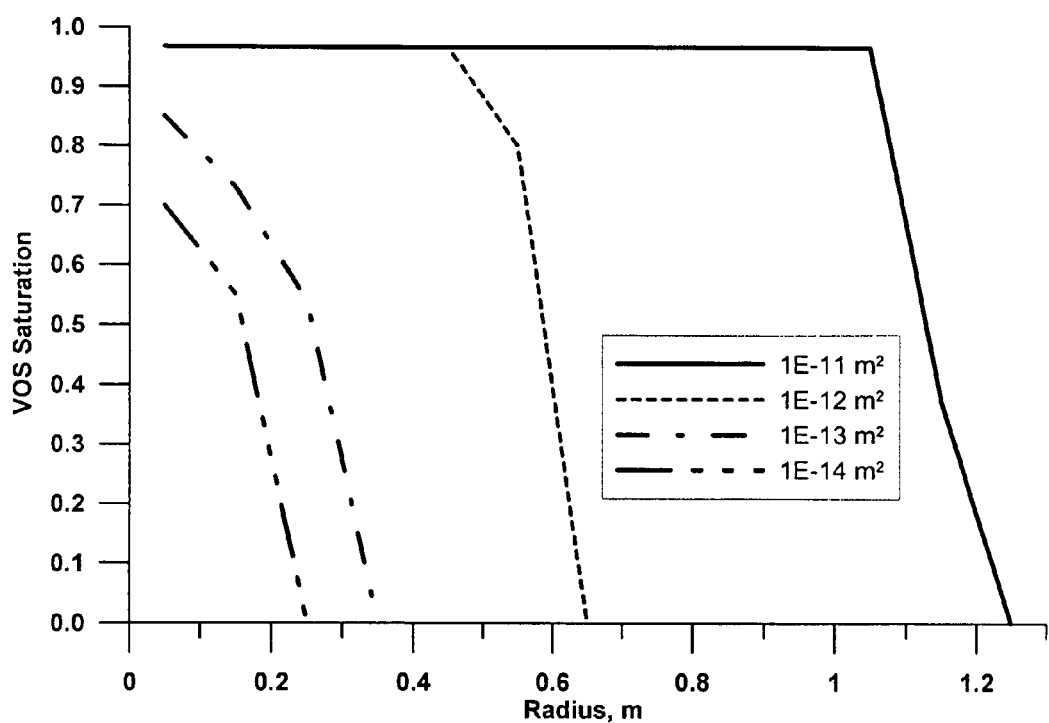

As stated previously, the maximum NAPL saturation that can be obtained is a function of residual formation water saturation and capillary pressure properties. The effect of this relationship can be observed in FIG. 16. The residual water saturation and capillary pressure effects typically increase as formation permeability decreases. Therefore maximum VOS saturations obtained decrease with formation permeability.

Effects of Anisotropy

The subsurface can very rarely be classified as homogeneous and isotropic. Most often there is some degree of anisotropy, typically in the form of alternating layers of formation materials with differing degrees of permeability. To investigate the effects of anisotropy, models were created to simulate two different conditions involving layering with permeability contrast. The formation materials in both cases were combinations of the 1E-12 and 1E-14 $m^2$ types. One simulation assumed that the 5 ft screened interval was completed exactly within a 5 ft thick horizontal high permeability zone (1E-12) capped on top and bottom with a lower permeability formation (1E-14). The other variation involved having the well screen intersect two horizontal high permeability zones, a 1 ft thick layer at the top of the well screen and a 2 ft thick layer at the bottom of the well screen.

Figure 17:
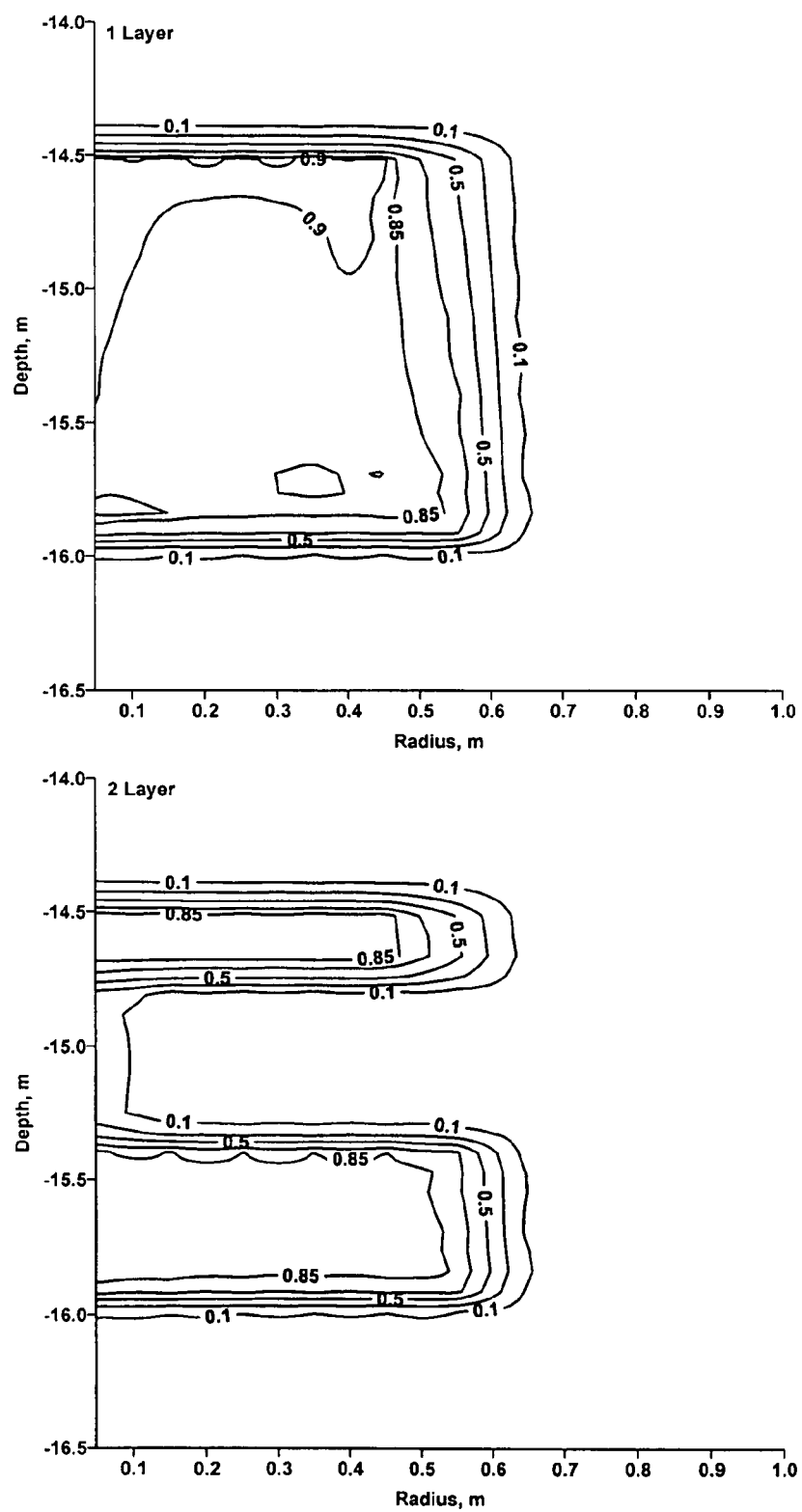
FIG. 17 and FIG. 18 set forth thixotropic gel and non-thixotropic oil distributions following injection.

It is believed that injecting into a "confined" high permeability layer would possibly increase the maximum radius reached by the injected gel. This possibility was considered probable because under these conditions flow in the vertical direction (upward or downward) away from the well screen is limited, therefore isolating the effective force from the constant pressure source in a solely horizontal direction. The results of the anisotropic simulations, however, suggest that this may not be the case. In both the 1 and 2 layer simulations the maximum radius reached is approximately 0.65 m (FIG. 17). This is similar to the maximum radius reached during the 30 psi homogeneous simulation that used the 1e-12 $m^2$ formation material (FIG. 13).

The VOS saturation decreases vertically downward within each layer at any given radius (FIG. 17). This can be attributed to changes in how the equilibrium saturation profile develops within high permeability formation materials that are in contact with low permeability units. Water within the formation in a high permeability, homogeneous case will tend to drain downward and, assuming that the water table is a significant distance away, the water saturation within the formation will tend to approach the residual saturation (0 in the case of 1E-12). However, when a high permeability material overlies a lower permeability material the draining water tends to "pool" on the interface between the contrasting materials. This creates a steepened water saturation profile over the thickness of the high permeability unit. Higher water saturations cause decreases in NAPL relative permeability and, therefore, decreases in flow rates and NAPL saturations near the wetting front. These effects are more pronounced near the bottom of the layers where water saturations are greater (FIG. 17).

Drainage Simulations

Figure 18A:
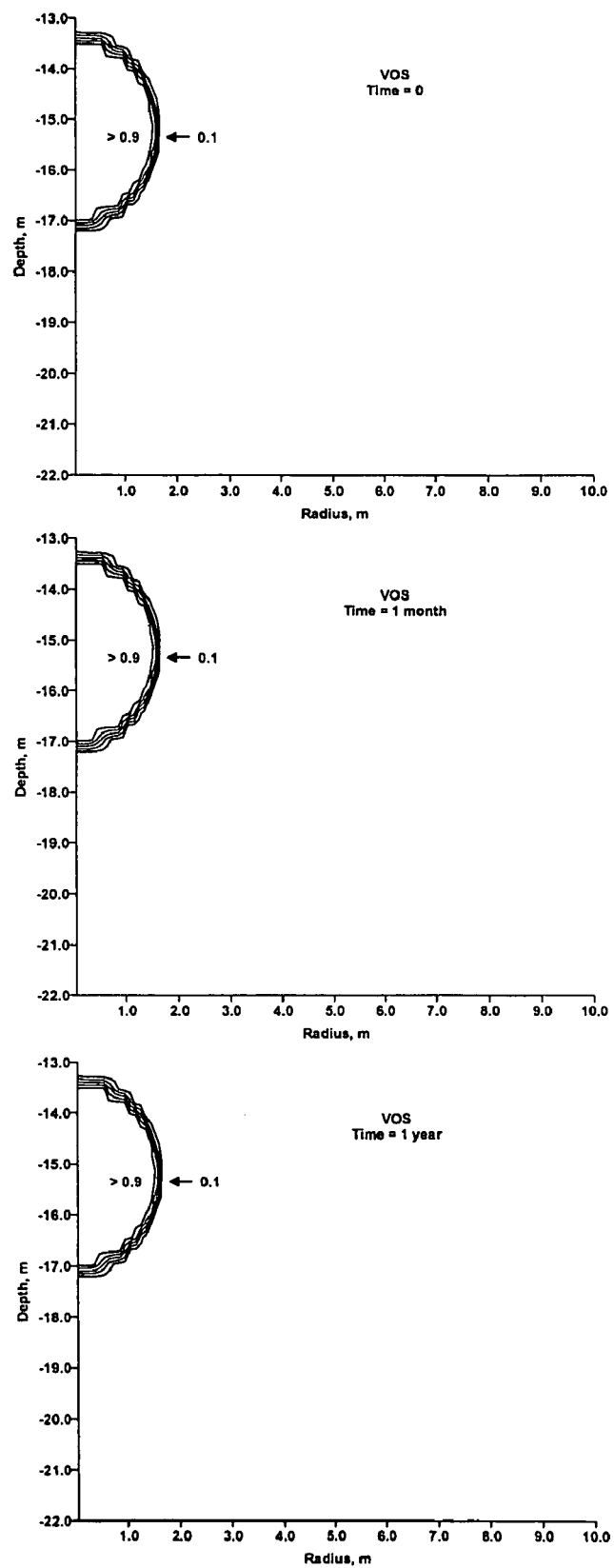
Figure 18B:
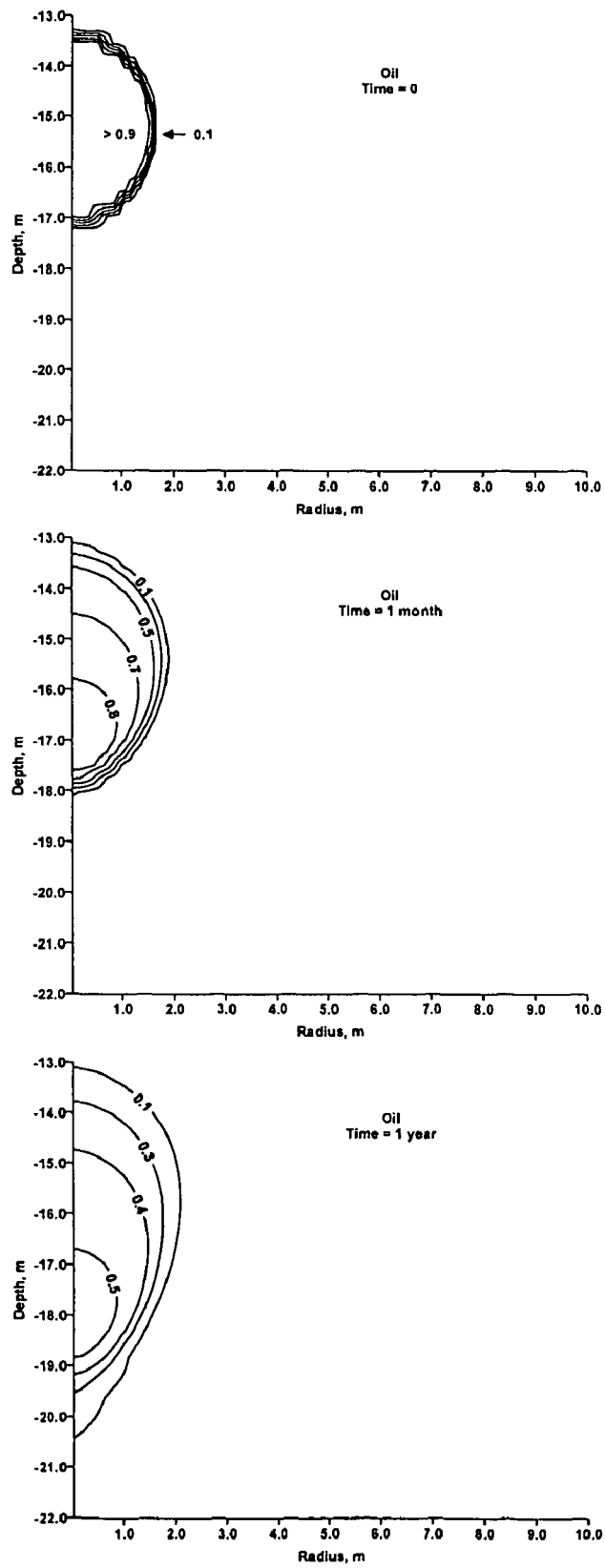

Simulations were created to investigate fluid behavior differences in the subsurface after injection is completed. This was accomplished by simulating constant flow rate injection into a homogeneous formation for both VOS and vegetable oil. The 1E-12 $m^2$ formation material was used in both simulations. The injection rate in each case was 10 L/m over a period of 10 hr for a total of 6000 L (1585 gal). After this 10 hour period was complete injection was ceased and a drainage period of 1 year was simulated (FIGS. 18A & 18B). NAPL partitioning into the aqueous and gaseous phases is ignored for these simulations.

In both cases the NAPL saturations within the NAPL bearing zones are high (>0.95). Observation of the vegetable oil simulation results shows that vegetable oil drains fairly readily. Within a month the lowest point of the wetting front has migrated nearly 2 meters vertically downward and the maximum NAPL saturation has decreased to less than 0.85. After a period of 1 year a 0.1 saturation portion of the wetting front has migrated down 3 meters and the overall maximum NAPL saturation has decreased to approximately 0.6 (FIG. 18B).

In the VOS case, however, there is negligible drainage even after 1 year. The potential gradient provided by gravity in this case is not large enough to decrease viscosity to the point where any appreciable flow occurs. The viscosities within the NAPL bearing zone are all on the order of $1\times10^7$ to $1\times10^9$ cP.

The preceding modeling exercise was limited to constant pressure injection. As illustrated in the above discussion, increasing the pressure during constant pressure injection will increase the distance the gel moves in the vadose zone. In addition, the gel can be injected under constant flow rate and under high pressure to create fractures filled with the gel in low permeability formations. One having ordinary skill in the art will recognize that there are multiple ways for injecting the thixotropic gel into the vadose zone.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged, both in whole, or in part. Therefore, the spirit and scope of the invention should not be limited to the description of the preferred versions contained therein.

The invention claimed is:

1. A process of bioremediation within a vadose zone comprising:
    identifying a vadose zone contaminant area;
    creating a thixotropic injectable solution comprising a mixture of an edible oil, water, and fumed silica;
    agitating said thixotropic injectable solution, thereby enabling said thixotropic injectable solution to be injected under pressure to a subsurface vadose zone;
    injecting said thixotropic solution into said vadose zone, said injectable solution thereby forming a non-migrating gel within said vadose zone;
    wherein said non-migrating gel establishes an in situ anaerobic environment in response to biological colonization within said non-migrating gel.

2. The process according to claim 1 wherein said step of creating a thixotropic injectable solution further comprises sparging the solution with nitrogen gas.

3. The process according to claim 1 wherein said step of creating a thixotropic injectable solution further provides for the additional step of removing free oxygen from said thixotropic injectable solution.

4. The process according to claim 1 wherein said step of creating a thixotropic injectable solution further comprises the additional step of introducing at least one bacterial strain adapted for in situ bioremediation in a subsurface soil environment.

5. A process of remediating volatile organic compounds within a vadose zone comprising:
- injecting a thixotropic material into a vadose zone contaminated with volatile organic compounds, said thixotropic material comprising a biodegradable oil;
- sequestering within said biodegradable oil said volatile organic compounds present within the vadose zone;
- establishing anaerobic conditions within said thixotropic material; and,
- degrading said volatile organic compounds by the metabolic activity of bacteria present within said thixotropic material.

6. The process according to claim 5 wherein said thixotropic gel is non-migratory following injection into the vadose zone.

7. The process according to claim 5 wherein said bacteria are native populations present within the vadose zone.

8. The process according to claim 5 wherein said bacterial further include bacterial strains which are introduced into said thixotropic material prior to injection.

9. A process of remediating heavy metals from subsurface soils comprising:
- injecting a thixotropic material into a subsurface region contaminated with heavy metals, said thixotropic material comprising a biodegradable oil;
- sequestering within said thixotropic material heavy metals from said surrounding soil; and,
- establishing conditions within said thixotropic material in proximity to said sequestered heavy metals wherein said heavy metals are treated by at least one of a treatment step selected from the group consisting of chelating said heavy metal, metabolizing said heavy metal, oxidizing said heavy metal, reducing said heavy metal, binding said heavy metal to a non-migratory substrate, and combinations thereof.

* * * * *

UNITED STATES PATENT AND TRADEMARK OFFICE
CERTIFICATE OF CORRECTION

| | | |
|---|---|---|
| PATENT NO. | : 7,896,577 B2 | Page 1 of 1 |
| APPLICATION NO. | : 12/074735 | |
| DATED | : March 1, 2011 | |
| INVENTOR(S) | : Riha | |

It is certified that error appears in the above-identified patent and that said Letters Patent is hereby corrected as shown below:

Title page, item [75], inventor name should read -- Riha --.

Signed and Sealed this
Nineteenth Day of July, 2011

David J. Kappos
*Director of the United States Patent and Trademark Office*